(12) United States Patent
Miklós et al.

(10) Patent No.: US 9,055,389 B2
(45) Date of Patent: Jun. 9, 2015

(54) METHOD AND NETWORK NODE FOR HANDLING BEACON SIGNAL TRANSMISSION

(75) Inventors: György Miklós, Pilisborojenö (HU); Gabor Fodor, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 453 days.

(21) Appl. No.: 13/498,156

(22) PCT Filed: Dec. 30, 2011

(86) PCT No.: PCT/SE2011/051610
§ 371 (c)(1),
(2), (4) Date: Mar. 26, 2012

(87) PCT Pub. No.: WO2013/100834
PCT Pub. Date: Jul. 4, 2013

(65) Prior Publication Data
US 2013/0172036 A1    Jul. 4, 2013

(51) Int. Cl.
*H04B 7/185* (2006.01)
*H04W 8/00* (2009.01)
*H04W 76/02* (2009.01)
*H04W 84/20* (2009.01)

(52) U.S. Cl.
CPC ............ *H04W 8/005* (2013.01); *H04W 76/023* (2013.01); *H04W 84/20* (2013.01)

(58) Field of Classification Search
USPC .................................................. 455/517, 507
See application file for complete search history.

(56) References Cited

U.S. PATENT DOCUMENTS

2008/0112334 A1* 5/2008 Laroia et al. .................. 370/254
(Continued)

FOREIGN PATENT DOCUMENTS

WO    2011116815 A1    9/2011

OTHER PUBLICATIONS

Corson, et al., "Toward Proximity-Aware Internetworking", The Internet of Things. IEEE Wireless Communications, Dec. 2010, 26-33.

(Continued)

*Primary Examiner* — Tu X Nguyen
(74) *Attorney, Agent, or Firm* — Murphy, Bilak & Homiller, PLLC

(57) ABSTRACT

According to a first aspect of embodiments herein, the object is achieved by a method in a method in a network node for handling beacon signal transmission. The beacon signal transmission is for discovering devices for Device to Device, D2D, transmission. The network node is associated with a cellular communications network. The network node obtains (1401) information from a number of master devices within a specific area comprised in the cellular communications network. The respective information comprises information about location and capability of D2D transmission of the respective master devices. The network node then decides (1403) properties for beacon signal transmission from a first master device. The deciding is based on the obtained information, and the number of master devices within the specific area.

48 Claims, 18 Drawing Sheets

(56) References Cited

U.S. PATENT DOCUMENTS

| | | | |
|---|---|---|---|
| 2010/0128701 A1* | 5/2010 | Nagaraja | 370/338 |
| 2010/0165882 A1 | 7/2010 | Palanki et al. | |
| 2010/0169498 A1 | 7/2010 | Palanki et al. | |
| 2011/0258313 A1 | 10/2011 | Mallik et al. | |

OTHER PUBLICATIONS

Fodor, et al., "Design Aspects of Network Assisted Device-to-Device Communications", IEEE Communications Magazine, Mar. 2012, 170-177.

* cited by examiner

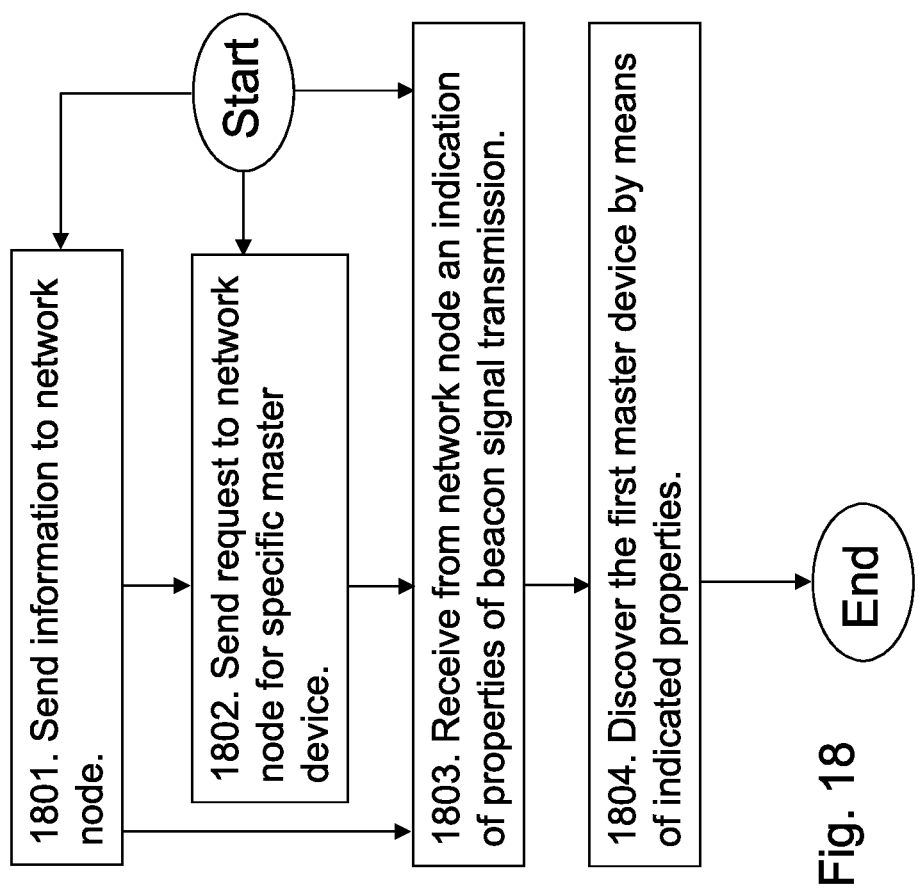

METHOD AND NETWORK NODE FOR HANDLING BEACON SIGNAL TRANSMISSION

TECHNICAL FIELD

Embodiments herein relate to a network node and methods therein. In particular, it relates to handling beacon signal transmission.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, handheld, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

A number of peer-to-peer technologies are used to connect devices wirelessly, such as WLAN or Bluetooth. To enable neighboring devices within wireless range to discover each other, these technologies employ a device discovery procedure whereby one of the devices sends beacon signals, which is received by the other device, and hence it becomes aware of the sender's vicinity.

Recently, a technology has been proposed to enable a kind of "wireless sense" where all devices equipped with this technology can discover each other. This technology, similarly to Bluetooth, does not require or make use of a network infrastructure, other than that this technology utilizes signals for node synchronization.

Cellular network assisted Device-to-Device (D2D) communication has recently been proposed as a means of increasing the spectrum efficiency, reducing the resource usage and minimizing latency for short range communications. Similarly to the wireless sense technology and Bluetooth, peer discovery is a prerequisite for network assisted D2D communications as well, that enables devices to detect that they are in the proximity of one another.

D2D communication enables a direct link of a device, user equipment UE, terminal, etc to another device. This provides large volumes of media or other data to be transferred from one device to another over short distances and using a direct connection. This form of device to device transfer would enable the data to be transferred without the need to run it via the cellular network itself, thereby avoiding problems with overloading the network and enabling proximity based applications such as to enable new types of applications that rely on proximity awareness.

Regarding wireless peer-to-peer technologies such as WLAN or Bluetooth, the discovery process comprising transmitting, receiving and processing beacon signals consumes energy in both the transmitter and the receiver devices. Further they use scarce wireless resources e.g. spectrum and power. The existing peer discovery technologies operate independently of the underlying cellular network. Typically, the device discovery phase of Wireless Local Area Network (WLAN) or Bluetooth is triggered by a user of a device. For this reason, the discovery process is limited in time, frequency and power, and performed only when needed.

SUMMARY

It is therefore an object of embodiments herein to provide a way of improving the process of discovering devices for D2D transmission.

According to a first aspect of embodiments herein, the object is achieved by a method in a method in a network node for handling beacon signal transmission. The beacon signal transmission is for discovering devices for Device to Device, D2D, transmission. The network node is associated with a cellular communications network. The network node obtains information from a number of master devices within a specific area comprised in the cellular communications network. The respective information comprises information about location and capability of D2D transmission of the respective master devices. The network node then decides properties for beacon signal transmission from a first master device. The deciding is based on the obtained information, and the number of master devices within the specific area.

According to a second aspect of embodiments herein, the object is achieved by a method in a first master device for handling beacon signal transmission. The beacon signal transmission is for discovering devices for Device to Device, D2D, transmission. The first master device is comprised in a number of master devices in a specific area within a cellular communications network 100. The first master device sends information to a network node associated with the cellular communications network. The information comprises information about location and capability of Device to Device, D2D, transmission of the first master device. The first master device receives an indication of properties for beacon signal transmission from the network node. The beacon signal is to be transmitted from the first master device. The properties are adapted to the number of master devices within the specific area and their respective location and capability of D2D transmission.

According to a third aspect of embodiments herein, the object is achieved by a method in a slave device for handling beacon signal transmission. The beacon signal transmission is for discovering devices for D2D transmission. The slave device is comprised in a specific area within a cellular communications network. The slave device receives, an indication of properties of beacon signal transmission from a network node associated with the cellular communications network. The beacon signal is to be transmitted from a first master device within the specific area to the slave device. The properties are adapted to the number of master devices, within the specific area and their respective location and capability of D2D transmission.

According to a fourth aspect of embodiments herein, the object is achieved by a network node for handling beacon signal transmission. The beacon signal transmission is for discovering devices for Device to Device, D2D, transmission. The network node is associated with a cellular communications network. The network node comprises an obtaining circuitry configured to obtain information from a number of master devices within a specific area comprised in the cellular communications network. The respective information comprises information about location and capability of D2D transmission of the respective master devices. The network node further comprises a deciding circuitry configured to decide properties for beacon signal transmission from a first master device. The deciding is based on the obtained information, and the number of master devices within the specific area.

According to a fifth aspect of embodiments herein, the object is achieved by a first master device for handling beacon signal transmission. The beacon signal transmission is for discovering devices for Device to Device, D2D, transmission. The first master device is arranged to be comprised in a number of master devices in a specific area within a cellular communications network. The first master device comprises a transmitting circuitry configured to send information to a network node associated with the cellular communications network. The information comprises information about location and capability of D2D transmission of the first master device. The first master device further comprises a receiving circuitry configured to receive an indication of properties for beacon signal transmission from the network node. The beacon signal is to be transmitted from the first master device. The properties are adapted to the number of master devices within the specific area and their respective location and capability of D2D transmission.

According to a sixth aspect of embodiments herein, the object is achieved by a slave device for handling beacon signal transmission. The beacon signal transmission is for discovering devices for D2D transmission. The slave device is arranged to be comprised in a specific area within a cellular communications network. The slave device comprises a receiving circuitry configured to receive, an indication of properties of beacon signal transmission from a network node associated with the cellular communications network. The beacon signal is to be transmitted from a first master device within the specific area to the slave device. The properties are adapted to the number of master devices within the specific area and their respective location and capability of D2D transmission.

The network node decides properties for beacon signal transmission from the first master device based on the location and capability of D2D transmission of the respective master devices the specific area, and based on the number of master devices within the specific area. This means that by adapting the properties of the master beacon signal transmissions and the slave device discovery process in this way, it is possible to decrease the power consumption of the master and/or slave device, since the devices may limit their transmission or reception to the cases when there is a higher chance of successful beacon signals sending. It is also possible to reduce unnecessary resource utilization due to beacon signal transmissions since less beacon signal collisions or beacon signals are sent when there is no slave listening to it.

An advantage with embodiments herein is that the network assisted device discovery scheme also allows to discover whether a given peer is in local range or not. If the peer is in local range, a device-to-device wireless technology may be used; if the peer is not in local range, communication may commence via the cellular communications network. Both cases may be handled in the same device discovery framework.

BRIEF DESCRIPTION OF THE DRAWINGS

Examples of embodiments herein are described in more detail with reference to attached drawings in which:

FIG. 18 is a flowchart depicting embodiments of a method in a slave device.

DETAILED DESCRIPTION

Figure 1:
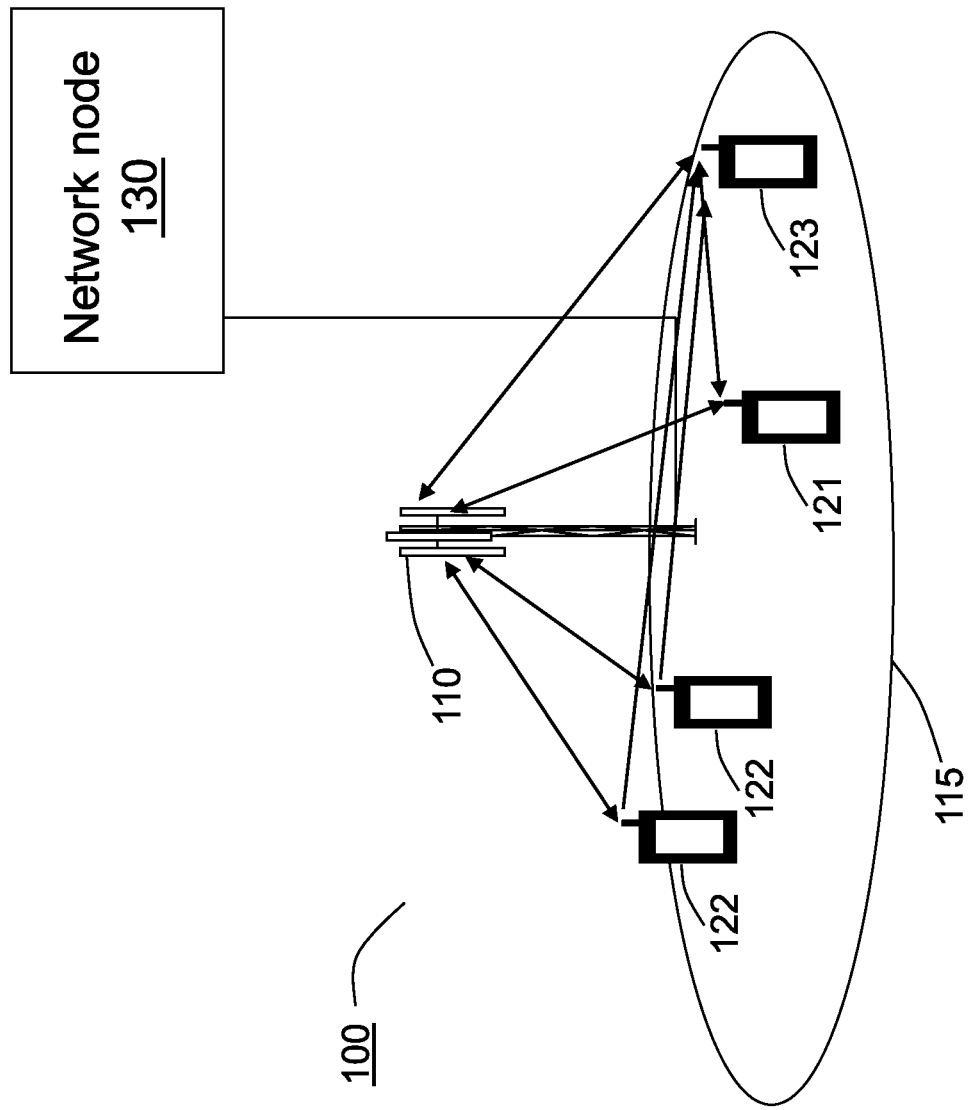
FIG. 1 is a schematic block diagram illustrating embodiments in a cellular communications network.

As part of developing the embodiments herein, a problem will first be identified and discussed. As mentioned above, the existing peer discovery technologies operate independently of the underlying cellular network, and hence they do not make use of any potential improvement that may arise from the availability of the cellular network. Typically, the device discovery phase of WLAN or Bluetooth is triggered by a user of a device, and automatic device discovery is hence not available.

The wireless sense technology also operates independently of the cellular coverage, apart from the timing synchronization that may be derived from the cellular network or other external source such as the Global Positioning System GPS. For that reason, this technology also does not make use of possible optimizations that may arise based on the availability of the cellular network. Besides, the wireless sense technology, is a custom proprietary technology that may not be available in all terminals, and for that reason its usage may be confined to discovering peers implementing the same proprietary technology.

Currently, there is no solution presented to adapt the device discovery method to the actual deployment, device density and device characteristics such as power supply or maximum transmit power capability. Applying the same solution in all cases may however lead to sub-optimal performance, discovery failure, increased battery and spectrum resource usage or unacceptably long discovery time.

Embodiments will be exemplified in the following non-limiting description.

Embodiments herein take advantage of a network infrastructure to control and assist the peer discovery procedure of wireless devices. To this objective, a network node, a master device, a slave device and methods are provided that uses signaling and measurements to gather information about the position and capabilities of the devices, network load and resource availability. This may be e.g. be performed by a Device Discovery Control System (DDCS) within the network node. A particular advantage of the embodiments herein is that the burden of peer discovery is not at the network infrastructure and thereby the mechanism is scalable in terms of the number of peers. At the same time, the mechanism takes advantage of the presence of a network infrastructure such that the problems of the WLAN or Bluetooth type of discovery are mitigated.

According to embodiments herein, the master and optionally the slave nodes register at the network node, and the network node uses signaled input and measurement data and controls devices to broadcast, i.e. transmit beacon signals and receive such beacon signals. Thus, the specific beacon characteristics and the resources used for beacon signal transmission, possibly adapted to the specific load, device characteristics and position information gathered in the above step, are controlled and known both at the beacon sending and the beacon receiving nodes that helps the devices to find one another in a resource and energy efficient fashion.

FIG. 1 depicts a cellular communications network 100 in which embodiments herein may be implemented. The cellular communications network 100 is a wireless communication network such as an LTE, WCDMA, GSM network, any 3GPP cellular network, Wimax, or any cellular network or system.

The cellular network 100 comprises one or more cells. In FIG. 1, a base station 110 is serving a cell 115. The base station 110 may be a radio base station such as e.g. an NodeB, an eNodeB, or an Home Node B, an Home eNode B or any other network node capable to serve a terminal or a machine type communication device in a cellular communications network.

A number of terminals are located in the cell 115. The terminals may have the role of being a master device or a slave device. These roles will be further discussed below. In the example scenario of FIG. 1, four terminals are located in the cell 115 whereof three terminals are master devices, a first master device 121, and two other master devices 122. The first master device 121, and the other master devices 122 are configured to transmit beacon signals. The beacon signals are transmitted so that slave devices shall be able to hear the beacon signal for discovering a master device for Device to Device (D2D) transmission. To distinguish the master device 121 from the other master devices 122 in this document, the master device 121 is referred to as the first master device 121, even though no master device denoted second master device is present.

The fourth terminal in the cell 115 is a slave device 123. The slave device 123 is configured to receive beacon signals. This means that the slave device 123 may receive i.e. listen for beacon signals transmitted by a master device such as e.g. first master device 121, and the other master devices 122 for discovering a master device that the slave device can communicate with, using D2D transmission.

The first master device 121, the other master devices 122 and the slave device 123 are capable of communicate with other master or slave devices in the cell 115 using D2D transmission. The first master device 121, the other master devices 122 and the slave device 123 may e.g. be mobile terminals or wireless terminals, mobile phones, computers such as e.g. laptops, Personal Digital Assistants (PDAs) or tablet computers, sometimes referred to as surf plates, with wireless capability, or any other radio network units capable to communicate over a radio link in a cellular communications network.

Master and Slave Roles of Devices

When a terminal broadcasts a beacon signal to allow other terminals to discover it, the terminal sending the beacon is referred to as a master device such as the first master device 121, and the terminal receiving the beacon is referred to as a slave device such as the slave device 123. Beacon signal transmission by the first master device 121 allows the slave device 123 to discover the first master device 121. This is done in order to let the slave device 123 be aware that the first master device 121 can provide some service that may be interesting for the slave device 123. Note that in some embodiments a single node, for example a user handheld device such as a smart phone, may play the master and the slave roles simultaneously.

In other circumstances and usage scenarios, a given physical terminal takes the single role of being a master device or being a slave device only. For a given application, the master and slave roles should therefore be determined taking into account the power consumption constraints of the terminal in question, because the power consumption of a master and a slave node may be very different, depending on the circumstances. It may be enough for the first master device 121 to send a single beacon to let other terminals such as the slave device 123 within radio range discover its presence, while the slave device 123 may need to be listening for a longer period of time to be able to receive all master devices 121, 122 in range and this may consume more power. Therefore, it might be beneficial, depending on the constraints, to let a power limited terminal be the master device. In other scenarios, the power limited terminal may be the slave. It follows that the master-slave role assignment may be determined for a given application, taking into account expected usage patterns. The role assignment for a given application may be determined in advance using existing technology. Alternatively, the terminals may be advised to determine which one should play the master and slave roles, respectively, where it may also be taken into account factors such as the expected energy consumption and the speed of device discovery.

The first master devices 121 is assumed to provide some service to the slave device 123. The services may be categorized into service categories. The services may be any kind of service such as printing services, chat room application, and file transfer application. Providing a service by the first master device 121 is a generic concept, and it may be that in the actual application the slave acts more like a "server". Still, when the slave device 123 detects the beacon of the first master device, the beacon may include some information about the type of service that the first master device 121 provides in order to let the slave decide whether it is interested in proceeding with setting up a connection with the master, e.g. by transmitting a paging message to the master. The beacon may also comprise an identifier of the first master device 121. Besides master device identification, this also allows the slave devices that are specifically interested in connecting to a given master device to find that node.

Terminals such as the terminals in FIG. 1, attempt to discover other terminals in a local range that can provide a given type of service. The terminals may make use of some D2D technology and broadcast a beacon signal which can be received by the peers, thereby enabling device discovery. There may be multiple D2D technologies in operation which may carry a beacon signal. Possible options include 802.11 WLAN, Bluetooth, or a possible future D2D extension of LTE, or other technologies such as the wireless sense technology. There may be more than one D2D technologies in operation in the same network, possibly using different spectrum bands or carrier frequencies, and terminals may have varying capabilities to support one or several of them.

According to embodiments herein, the communication network 100 provides methods that assists the terminals such as the terminals in FIG. 1, in the device discovery process. The methods are controlled in a network node 130. The network node comprises functionality to control the device discovery process. This functionality may be referred to as a Device Discovery Control System (DDCS). The terminals may exchange signaling with the DDCS via an operator's network which may be based on some 3GPP RAN, or some of the terminals may even use fixed access. The operator network may also provide terminal location information to the network node 130 or direct to the DDCS if applicable, with a certain granularity, e.g. GPS coordinates. The network node 130 may be a single type of node comprising all functionality to control the device discovery process according to embodiments herein performing all its actions itself. Alternatively, the network node 130 may comprise multiple nodes that are collocated or logically collocated with signaling interactions. This means that in the latter, functionality to control the device discovery process and the method is implemented in multiple nodes. It may also be implemented in multiple servers, in that case the network node 130 may comprise of a number of servers. As an example, the network node 130 and its functionality to control the device discovery process may be implemented as a 3GPP IP Multimedia Subsystem (IMS) application server, or in a new core network node, or partly in the LTE RAN, or in an external third party server, or a combination of these, possibly signaling with a Location Control Services (LCS) Server and/or a 3GPP Mobility Management Entity (MME) and/or a 3GPP Serving GPRS Support Node (SGSN). The network node 130 comprising the functionality to control the device discovery process such as a DDCS, is regarded as a single logical entity in this document, but it is clear for the skilled in the art that there may be many alternative implementation options for the functionality to control the device discovery process.

The network node 130 is a node that is associated with the cellular communications network 100, for example, the network node 130 may be part of an operator core network, or it may be outside an operator core network and run by a third party. The network node 130 is configured to handle beacon signal transmission within the cellular communications network 100. The beacon signal transmission is for discovering devices for D2D transmission.

Figure 2:
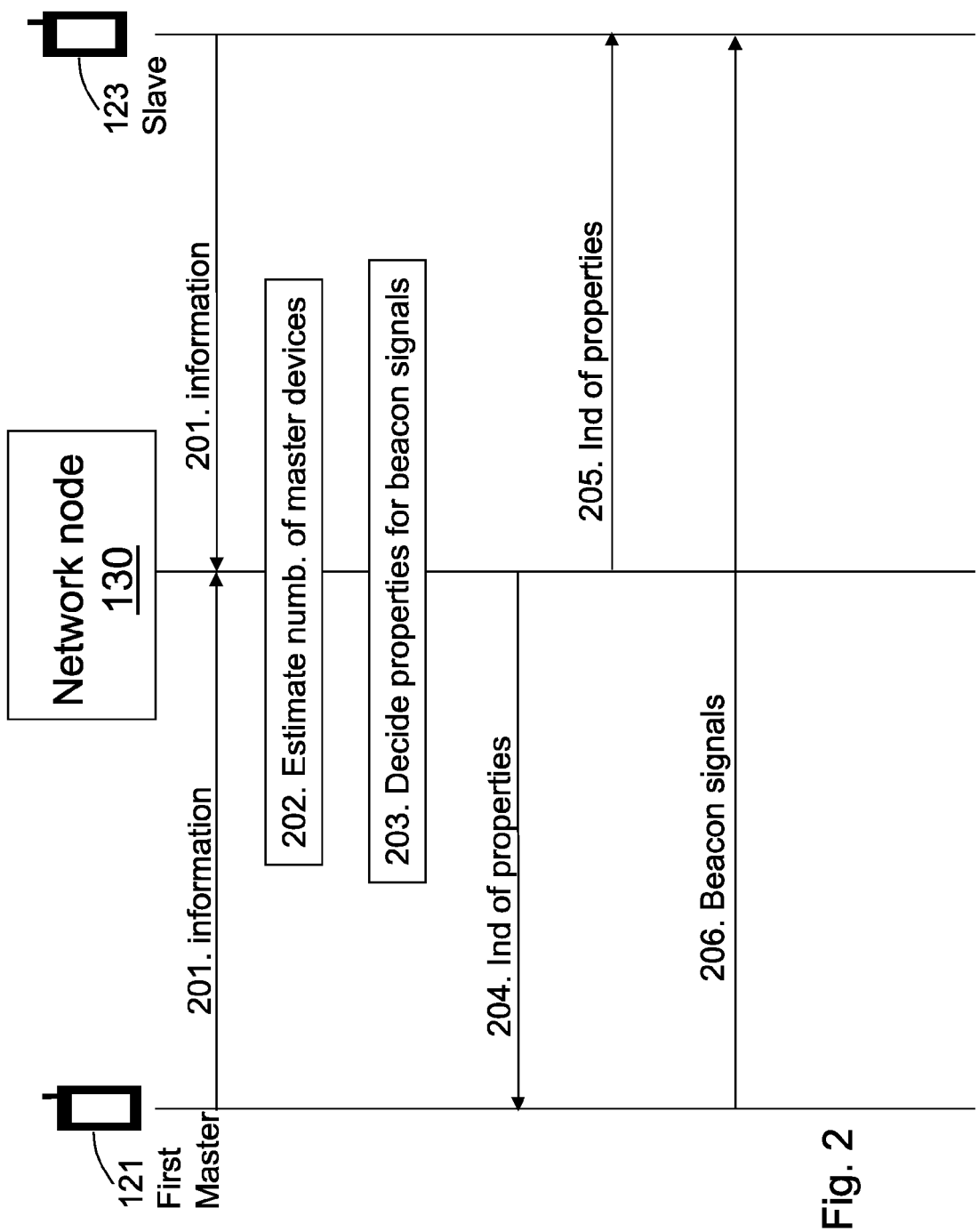
FIG. 2 is a combined flowchart and signalling scheme depicting embodiments of a method in a cellular communications network.

Firstly, a general overview of embodiments of a method herein will be described in relation to FIG. 2. The overview illustrates how the different nodes involved in the method interacts. The different nodes are the network node 130, the first master device 121, the other master devices 122, and the slave device 123.

This will be followed by a more detailed description of the method and respective nodes.

Figure 14:
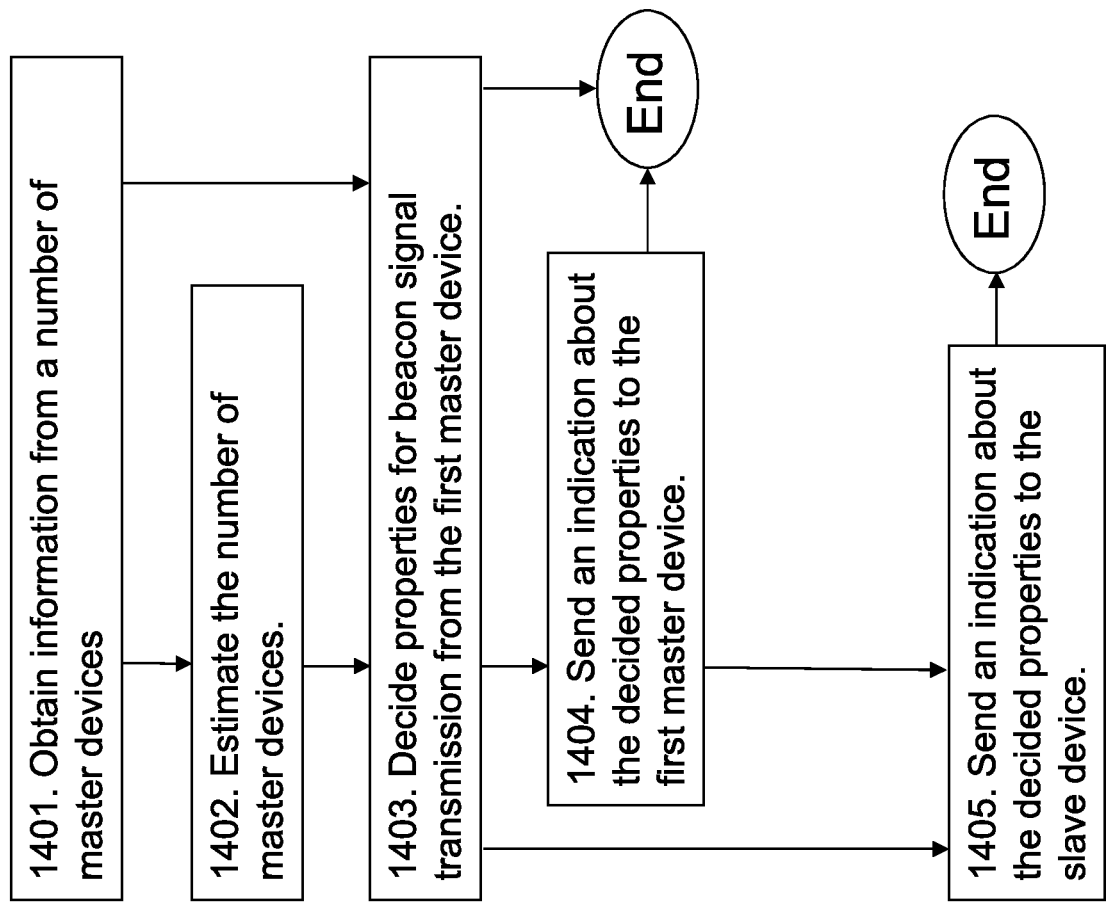
FIG. 14 is a flowchart depicting embodiments of a method in a network node.

Then embodiments of the method in the respective different node will be described in FIGS. 14, 16 and 18, and embodiments of the respective node will be described FIGS. 15, 17 and 19.

An example of embodiments of a method for handling beacon signal transmission in the cellular communications network 100, will now be described with reference to a combined flowchart and signalling scheme depicted in FIG. 2. The method comprises the following actions, which actions may be taken in any suitable order.

Action 201

To be able to decide which properties be used for the beacon signal transmission, the network node 130 collects information from the master devices 121, 122. The other master devices 122 are not shown in FIG. 2. This means that in this action a number of master devices 121, 122, sends information which is obtained by the network node 130. This may be performed by the master devices 121,122 registering at the network node 130. The number of master devices are comprised within a specific area comprised in the cellular communications network 100. The specific area may comprise one or more cells including the cell 115. The first master device 121, the other master devices 122 and any further master devices are comprised within the specific area.

The respective information comprises information about location and capability of D2D transmission of the respective master devices 121, 122. How this is performed will be described more in detail below. The obtained information may further comprise information about the number of master devices within the respective master device's 121, 122 D2D range. This is an advantage since it is useful to know how many master devices that may potentially collide with the beacon signal transmission at the slave device 123 when receiving beacon signals.

The obtained information from the respective master device 121, 122 may also comprise information about which service it offers.

This action of obtaining information may also comprise obtaining information from a number of slave devices within the specific area. The number of slave devices comprises the slave device 123. The respective information may comprise information about location and capability of D2D transmission of the respective slave devices 123. The respective information may further comprise information about the estimated number of master devices 121,122 within the D2D range of the respective slave devices 123. This is an advantage since it is useful to know how many master devices that may potentially collide with the beacon signal transmission at the slave device 123.

Action 202

In this action the network node 130 may estimate the number of master devices 121, 122 within a D2D range of the slave device 121. They may be estimated by establishing average values of number of master devices 121, 122 within a D2D range of the slave device 121 received from the master devices 121, 122.

Action 203

The network node 130 then decides properties for beacon signals that shall be transmitted from the first master device 121. The deciding is based on the obtained information, and the number of master devices 121, 122 within the specific area.

An example of properties that may be decided is whether the first master device 121 shall use random beacon signal transmission on a shared resource, or scheduled beacon signal transmission. This decision may be based on whether the first master device 121 is in idle mode or not, and/or on the number of handovers of the first master device 121 within the specific area. How this is performed will be described more in detail below.

An example of properties that may be decided is whether the first master device 121 shall use on demand beacon signal transmission, or autonomous beacon signal transmission. This decision may be based on a calculated overhead of on demand beacon signal transmissions within the specific area and a calculated overhead of autonomous beacon signal transmissions within the specific area. How this is performed will also be described more in detail below.

Action 204

The network node 130 may then send an indication about the decided properties to the first master device 121. The indication may e.g. relate to radio access technology, and timing and frequency channel properties of the beacon signals.

The received indication may comprise whether the first master device 121 shall use random beacon signal transmission on a shared resource, or scheduled beacon signal transmission. The use is adapted to whether the first master device 121 is in idle mode or not, and/or adapted to the number of handovers of the first master device 121 within the specific area. How this is performed will also be described more in detail below.

The received indication may further comprise whether the first master device 121 shall use on demand beacon signal transmission, or autonomous beacon signal transmission. The use is adapted to an overhead of on demand beacon signal transmissions within the specific area and an overhead of autonomous beacon signal transmissions within the specific area. How this is performed will also be described more in detail below.

Action 205

In some embodiments the network node 130 sends an indication about the decided properties to the slave device 123. Knowing the about the decided properties makes it easier for the slave device 123 to listen to the beacon signals to be transmitted by the first master device 121 and in that way discover the first master device 121. In some embodiments, the indication comprises whether to register a device discovery request of the slave device 123 at the network node 130 or not. In some embodiments, the indication comprises timing and frequency channel properties that should be used by the slave device 123 to receive beacon signals transmitted by the first master device 121.

The received indication may comprise whether the first master device 121 shall use random beacon signal transmission on a shared resource, or scheduled beacon signal transmission. The use is adapted to whether the first master device 121 is in idle mode or not, and/or adapted to the number of handovers of the first master device 121 within the specific area.

The received indication may further comprise whether the first master device 121 shall use on demand beacon signal transmission, or autonomous beacon signal transmission. The use is adapted to an overhead of on demand beacon signal transmissions within the specific area and an overhead of autonomous beacon signal transmissions within the specific area.

In some embodiments, the received indication of properties comprises whether to register a device discovery request of the slave device 123 at the network node 130 or not. The received indication of properties may further comprise timing and frequency channel properties of the beacon signals transmitted by the first master device 121.

In some embodiments, the slave device 121 may request the network node 130, to discover a specific master device with certain characteristics. This may be comprised in the information sent in Action 201 or be sent separately. This may e.g. be a characteristic which provides a given service at a specific location or to re-discover a device with which there was earlier communication. This action of sending may then comprise an indication of properties of beacon signal transmission to be transmitted by the specific master device. The specific master device may e.g. be the first master device 121.

Action 206

After receiving the indication about the decided properties from the network node 130, the master device 121 knows what properties to use to transmit the beacon signals. Therefore in this action, the master device 121 transmits beacon signals according to the received indication of properties of beacon signal transmission. The slave 123 listens to the beacon signal transmitted by the first master device 121 and when the slave device 123 hears, i.e. receives the beacon signals it discovers the first master device 121. This may in some embodiments be performed by listening to the beacon signal transmission according to the indication of properties of beacon signal transmission when received in action 204.

Here follows the more detailed description of embodiments of the methods herein as mentioned above.

Adapting Beacon Signal Transmission of the Master Devices 121, 122

This relates to Action 203 regarding deciding properties and Action 204 regarding sending the decided properties to the master device 121 mentioned above.

According to the embodiments herein, signaling is used for sending the indication about the decided properties for adapting the beacon signal transmission of the master devices such as the first master device 121 and the other master devices 122. The example here is given to the first master device 121. This may be achieved either by explicit signaling to a given master device such as the first master device 121, or using broadcast or multicast to signal to all or a subset of the master devices 121, 122 in the specific area.

E.g. the following beacon signal transmission properties of the first master device 121 may be decided to be adapted. It is possible to adapt one or more of the following properties. The list below is not exhaustive.

- The Radio Access Technology (RAT) to use for sending beacon signals.
- The timing and the specific frequency channels, e.g. OFDM subcarriers, or coding or power levels of the beacon resources.
- The total amount of resources available for sending beacon signals for the master device 121. For example, this may be an indication of specific frequency channels, scrambling codes or maximum power that the master may use for transmitting beacon signals.
- Whether a certain resource for sending beacon signals is shared between multiple master devices 121, 122, or dedicated to the first master device 121 as a single master. Such an indication allows the first master device 121 to choose between contention avoidance and contention resolution algorithms for the current device discovery session. Dedicating a resource to a single master device avoids collisions which is an advantage. On the other hand, this is more complex and requires some signalling overhead to dedicate the resource to the master device.
- The amount of beacon signal transmissions by the first master device 121 such as e.g. one beacon signal in every ten seconds.
- Whether or not to randomize the sending of a beacon within a given resource pool. Randomization means that the first master device is allowed to autonomously pick the particular resources used for beacon signal transmission, rather than receive an indication from the network node 130 specifying the resources that the first master device 121 shall use. If the beacon sending is randomized, the following properties may also be adapted.
  - The probability of sending a beacon signal in a given resource. The network node 130 may specify a probability, e.g. 1/10, and then in each resource unit, the first master device 121 makes a random decision with the given probability to send a beacon.
  - A set of resources out of which a random resource is selected for sending a beacon signal.
- A specific or maximum transmit power to be used for transmitting a beacon signal.
- The number of beacon signals to be sent; or a time interval when beacon signals are to be sent; or whether to send beacon signals until a signaling message is received.
- A service category applied for a master such as e.g., printing services, social networking services, file transfer services, advertisement services; or other parameters that are sent in the beacon signal transmission.
- Whether the first master device 121 is required to register its presence in the network or not.

Adapting the Device Discovery of the Slave Devices

This relates to Action 205 above regarding sending the decided properties to the slave device 123.

In some embodiments, it is also adapted how the slave device 123 discover the first master device 121. It is possible to adapt one or more of the following properties. The list is not exhaustive.

- Whether the slave device shall register its device discovery request in the cellular communications network 100 via the network node 130 or not. This may be based on broadcasting information on whether or not there are master devices such as the first master device 121 which autonomously send beacon signals. This may be communicated on a per service category basis.
- The timing and frequency resources that shall be used to receive beacon signals.

Inputs for Adapting Beacon Parameters

This relates to Action 201 above regarding the network node obtaining information from the first master device 121 and other master devices 122.

A number of input values may be used to determine how to best set the parameters listed above. These input values may comprise, but are not limited to, the following.

- Signaling from the first master device 121 and the other master devices 122 to the network node 130 which comprises location information such as the cell id, so that the network node 130 can estimate the number of master devices in a given area. This area may be a cell such as the cell 115, an area comprising several cells or an area not relating to cells.
- Signaling from the slave 123 and other slave devices to the network node 130 which comprises location information such as the cell id, so that the network node 130 can estimate the number of slave devices trying to discover some service in the specific area.
- Measurement data from the first slave device 123 and other slave devices about the number of master devices in their D2D range.
- Measurement data from the first master device 121 and other master devices 122 about the number of slave devices in their D2D range.

Beacon Signal Options

This relates to Action 203 above regarding the network node 130 deciding properties beacon signals.

There are several factors that may determine how the first master device 121 broadcasts beacon signals in terms of what resources the first master device 121 uses, what triggers the first master device 121 to transmit the beacon signal and at what time instants the first master device 121 shall transmit once the beacon signal transmission has been triggered. In the following, some of these options are listed, which will later be followed by a discussion about how to select between these options. While the individual options are state-of-the-art that are not novel in themselves, the adaptation to select the most appropriate option is novel.

The resource allocation for sending beacon signals may have two options:

- Random beacon signals: The first master device 121 broadcasts beacon signals in a randomized fashion on a shared time, frequency, code, etc. resource where beacon signal collisions are possible.
- Scheduled beacon signals: The network node 130 assigns time, frequency and code resources to the first master device 121 and each master device individually. The first master device 121 broadcasts beacon signals on the dedicated resource, so that collisions are avoided.

The resources for broadcasting beacon signals may be partitioned into service categories, so that a slave can restrict its reception to the service categories that it is interested in. This may apply to both random beacon signals and scheduled beacon signals.

Note that beacon signal collisions do not necessary entail that the beacon signals are not decodable by a given slave device. The slave device 123 may use successive interference cancellation and other multi-user detection techniques to decode beacon signals.

The triggering for sending beacon signals may be:

On demand, which means that the beacon signal sending is triggered by signaling from the network node 130 as a result of the slave device 123 is trying to discover the first master device 121 and registering at the network node 130. Note that on demand triggering may lead to one or many beacon signals. Triggering may be done via explicit signaling from the network node 130 to the concerned first master device 121; or possibly via broadcast or multicast in case of random beacon signals when there is no need for individual resource assignment to the first master device 121.

Autonomous, which means the beacon signal sending is done autonomously by the first master device 121, that is without external triggering, independently of any knowledge of the slave device 123 trying to discover the master device 121.

Regarding the timing of the beacon signals, there are a lot of options: beacon signals may be broadcasted periodically once per time period T, may be influenced by time-of-day schedules, may have a deadline after which no more beacon signals are transmitted unless explicit instruction comes, etc.

Master Device Registration in the Network Node 130

This relates to Action 201 above regarding the network node obtaining information from the first master device 121 and other master devices 122.

According to some embodiments, all master devices 121, 122 register their presence to the network node 130, independently whether they are going to periodically send beacon signals autonomously or not i.e. expecting some assistance from the network node 130 to trigger the beacon signal transmission.

The first master device 121 registering its presence in the network node 130 is useful since that would allow the network node 130 to know where the first master device 121 with a given service is located, assuming that location information is part of the registration, and the network node 130 may then relay that information to interested slave devices. Compared to a continuous beacon signal transmission, a registration at the network node 130 is expected to consume much less resources.

Registering the first master device 121 initially at the network node 130 means that the network node 130 knows about the services offered by the first master device 130 and its characteristics as well as the first master device's 121 device capabilities and properties. At the first master device 121 registration, the network node 130 also becomes aware of the first master device's 121 location, at least on the cell level. This is possible by the first master device 121 providing the cell-id, or by a network based scheme. Additional location updates may also take place as first master device 121 moves:

In connected mode, the current cell information may be transferred by a network operator to the network node 130 with a cell or at least base station granularity;

In idle mode, the network operator may provide Tracking Area (TA) level information to the network node 130;

According to the current disclosure, the first master device 121 may provide cell level information in idle mode by using Non Access Stratum (NAS) signaling to the MME each time it moves to a new cell. The information may be sent from the MME to the network node 130. The use of NAS signaling may be more efficient than Internet Protocol (IP) based, connected mode, signaling, since bearer setup can be avoided.

More accurate location updating is also possible, using Location Control Services (LCS) mechanisms or explicit signaling from the first master device 121 to the network node 130, using e.g., GPS information when available.

The first master device 121 registration at the network node 130 and location updating enables the network node 130 to provide an estimate for the services that are available at a given location in case a slave device asks for this. The network node 130 may also help the first master device 121 to assign appropriate time and frequency resources for beacon signal transmission.

The Discovery Process of the Slave

This relates to Action 206 above regarding transmission and receiving beacon signals.

There are two example of ways for the slave device 123 to engage in the discovery process.

Discovery without query to the network node 130. The slave device 123 starts to listen to beacon signal transmissions based on available information on the timing and frequency of these beacon signals. Such information may be broadcast or multicast by the network node 130.

Discovery with network node 130 query. The slave signals its request to the network node 130 to discover master devices 121, 122 with certain characteristics, or a single master device such as the first master device 121 with a specific ID. The network node 130 signals to the slave device 123 either via dedicated signaling or using multicast or broadcast information about master devices in terms of the characteristics that slave device 123 is interested in, beacon signal timings and resources or combination of these.

Discovery without network node 130 query but with the network node 130 broadcasting requires the following conditions.

A priori knowledge that the first master device 121 autonomously sends beacon signals. This is efficient only if there are many slave devices trying to discover the first master device 121 continuously or there is sufficient resource for the first master device 121 to autonomously send beacon signals. The network node 130 may broadcast information on whether or not there are master devices 121, 122 which autonomously send beacon signals.

The slave device 123 needs to know the timing and frequency to use for receiving beacon signals. This may be known or configured a priori e.g., using initial network node 130 signaling, or the information could be broadcast by the network node 130.

If these conditions hold, the slave device 123 may engage in listening to the beacon signals without network node 130 query. Otherwise, the slave device 123 queries the network node 130 its intention to discover a master device of certain characteristics. Whether or not the network node 130 query is used it may be controlled by the network node 130 itself, via broadcasting information about whether or not the slave device 123 shall signal to the network node 130. This may be controlled on a per service category basis.

The slave device 123 may signal its request to the network node 130 to discover master devices 121, 122 instantaneously. Alternatively, a slave device 123 may signal its request to discover master devices 121, 122 continuously as they appear. In that case, the slave device 123 would need to update the network node 130 about its location; this may be done in a similar way as the master devices 121, 122 update their location.

As a response to the slave device's 123 request, the network node 130 responds with signaling where the availability of the potential master devices 121, 122 in D2D range are listed, including the timing and/or frequency resources when they are expected to send beacon signals. This may point the slave device 123 to either scheduled or random beacon signal transmission resources.

Determining Beacon Options for the Master

This relates to Action 203 above regarding the network node 130 deciding the properties of beacon signals.

The network node 130 uses its available information to optimize the first master device 121 and slave device 123 operation, so that the power consumption of the first master device 121 and/or slave device 123 due to beacon signal transmissions and receptions are minimized, and the unnecessary resource consumption of beacon signals is also minimized. Below some of the decisions that may be performed in the network node 130 according to embodiments herein are discussed. The skilled in the art will understand that the network node 130 may also make other decisions and use different algorithms as well.

Random Vs. Scheduled Beacon Signals

The network node 130 determines whether to use random beacon signals on a shared resource, or scheduled, that is dedicated, beacon signals. In case the spatial density of the master devices 121, 122 e.g. in a given service category is below a threshold value, scheduled beacon signals may be more efficient as they avoid beacon signal collisions. On the other hand, for a high spatial density of master devices, random beacon signals can become more efficient. This is due to the fact that random beacon signals may allow the same shared resource to be re-used between multiple master devices 121, 122 that are sufficiently far away from each other so that their beacon signal transmissions do not interfere at a slave device. So it may be more efficient to use random beacon signals after a threshold density of master devices is reached.

As noted above, the choice between random and scheduled beacon signals depends on the actual number of master devices 121, 122 sending beacon signals in a given area. For the network node 130 to make the decision, it needs to know about the number of master devices 121, 122 that are transmitting beacon signals. This is possible based on the assumption that the master devices 121, 122 register their presence in the network node 130, and the network node 130 also gets updated about the location of the master devices 121, 122.

In addition to the number of master devices in a given area, e.g. the number of master devices 121, 122 in a given cell, the network node 130 also needs to know the number of master devices 121, 122 within D2D range of a given slave. This is needed to make the selection between scheduled and randomized beacon signals, but also to set the appropriate parameters for randomized beacon signal transmission. The number of master devices 121, 122 within D2D range may be estimated as a constant, configurable factor of the number of master devices 121, 122 per cell 115. Alternatively, the slave device 123 may report the measured number of master devices 121, 122 in D2D range to the network node 130. Yet another alternative is that the master devices 121, 122 may also receive the beacon signal transmission of other master devices and report this number to the network node 130.

Figure 3:
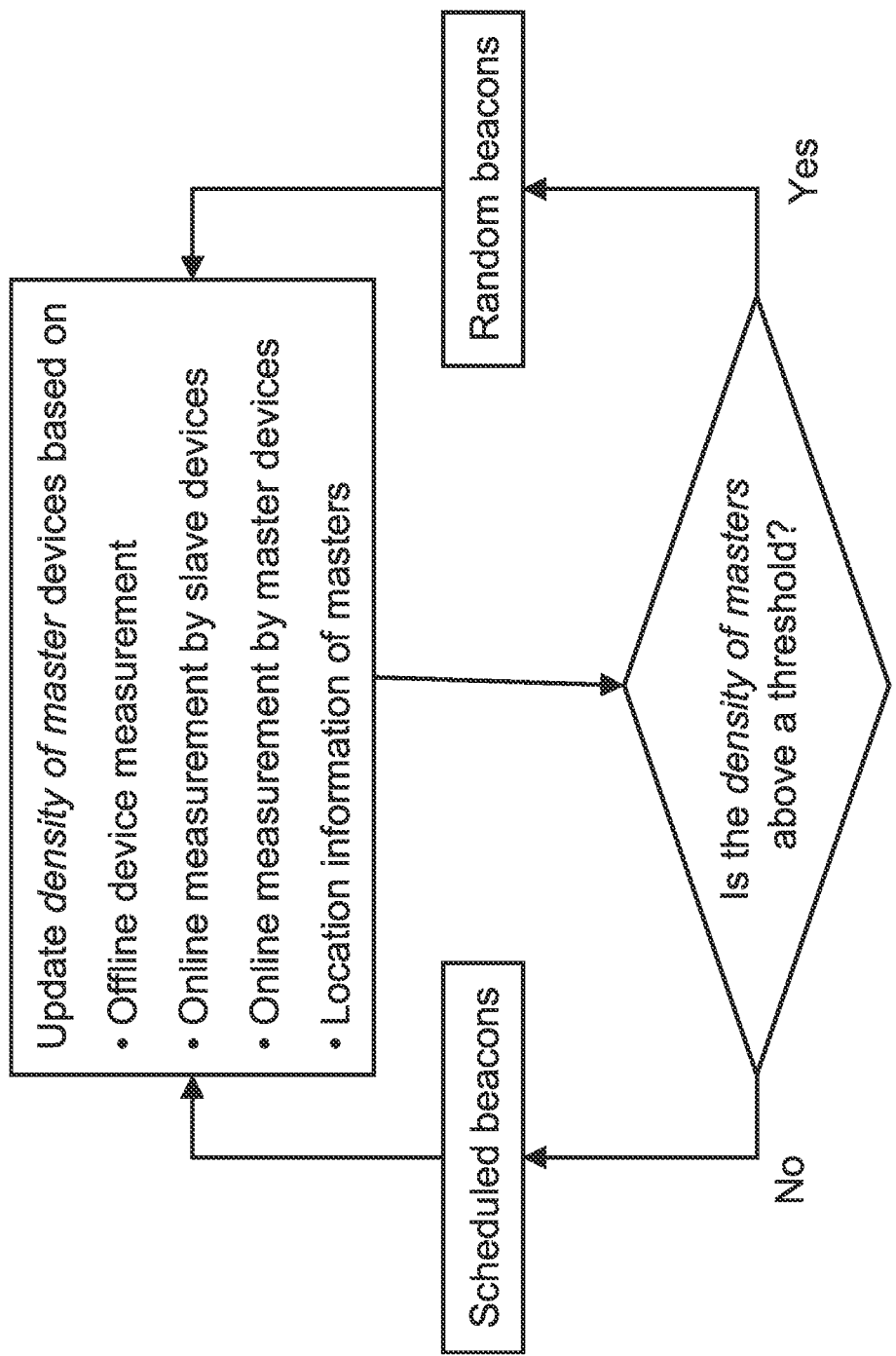
FIG. 3 is a flowchart depicting embodiments of a method in a cellular communications network.

The process is illustrated in the flowchart of FIG. 3. In this process, the network node 130 maintains a database about the density of the master devices 121, 122. This database is maintained with an appropriate location granularity, on per service category basis, and also on a per D2D technology basis. As FIG. 3 shows, the database on the density of the master devices 121, 122 is continuously updated based on new available information, such as measurement data from slave devices 123, or based on explicit location information of the master devices 121, 122. The network node 130 may apply averaging on the data to filter out very quick changes. Then the network node 130 checks whether the density of the master devices 121, 122 is above a certain threshold value. This check is performed for each master device 121, 122 separately; or for a group of closely located master devices 121, 122 simultaneously. The threshold value itself is a configuration parameter that may be set by the network operator. If the density of master devices 121, 122 is above a threshold value, the corresponding first master device 121, uses random beacon signals; whereas if the density is below a threshold value, the corresponding first master device 121 uses scheduled beacon signals. When the first master device 121 changes state between scheduled or random beacon signals, it shall be notified. For scheduled beacon signals, the network node 130 also signals the resource assignments for beacon signals. Note that it is possible to use a hysteresis to avoid frequent changes between the two states. This may be done such that the threshold value is lower if the first master device 121 is using random beacon signals, and higher if the first master device is using scheduled beacon signals.

As an alternative to random beacon signals, spatial re-use may also be achieved by using scheduled beacon signals in case more accurate location information is available, or other information regarding the propagation patterns of the beacon signal. Then it is possible to explicitly assign two master devices 121, 122 to the same resource as long as the network node 130 and/or the master devices 121, 122 know that spatial reuse is possible. In that case the network node 130 may assign also the maximum power level to the first master device 121. Hence, when accurate location information is available, the network node 130 may skip the above procedure for selecting between scheduled and random beacon signals, and always use scheduled beacon signals, possible assigning the same resource to two or more master devices 121, 122 when spatial reuse is deemed possible.

Another reason for using randomized beacon signals rather than scheduled beacon signals may be the high overhead of assigning scheduled beacon resources to the master devices 121, 122. This may be the case when the first master device 121 is in idle mode. In idle mode, there are two ways for the network node 130 to assign scheduled resources to the first master device 121. One way is that the first master device 121 becomes connected to receive explicit signaling, though this requires the overhead of idle-connected-idle transition signaling. Another way is that the network node 130 uses the broadcast channel to assign resources to the first master device 121. This may be a good way for the first master device 121 when being stationary, but for the first master device 121 being mobile and in idle mode the network node 130 does not have information about which cell the first master device 121 is camped at. Hence the network node 130 would have to assign resources at several cells, which also brings in overhead and may waste resources.

Figure 4:
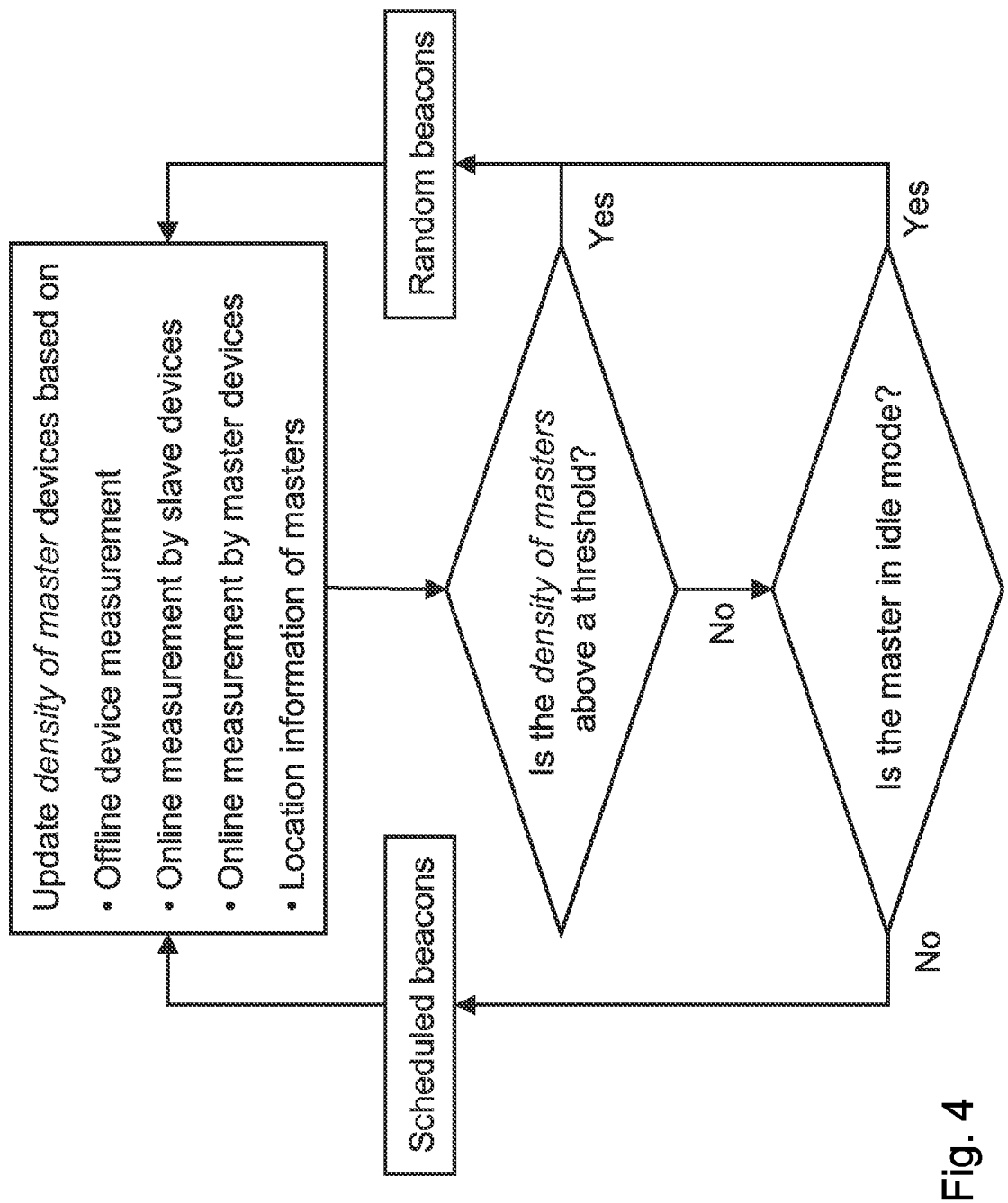
FIG. 4 is a flowchart depicting embodiments of a method in a cellular communications network.

Due to the overhead for scheduled beacon signals in idle mode, the network may decide to use the random beacon scheme for idle terminals, as shown in FIG. 4.

As another alternative for the overhead of scheduled beacon signals in idle mode, it is possible to use terminal-initiated signaling and a response signaling which includes beacon resource assignment. Such signaling may be performed after mobility of the first master device 121 when the beacon signal resource assignment would have to be updated. If necessary, the CN and the RAN may exchange signaling to provide the necessary info to the first master device. This may reduce the overhead, though it does not completely eliminate it. The overhead increases with the mobility of the first master device 121. So above a certain level of mobility, it may become more efficient or simpler to use random beacon signals instead.

Figure 5:
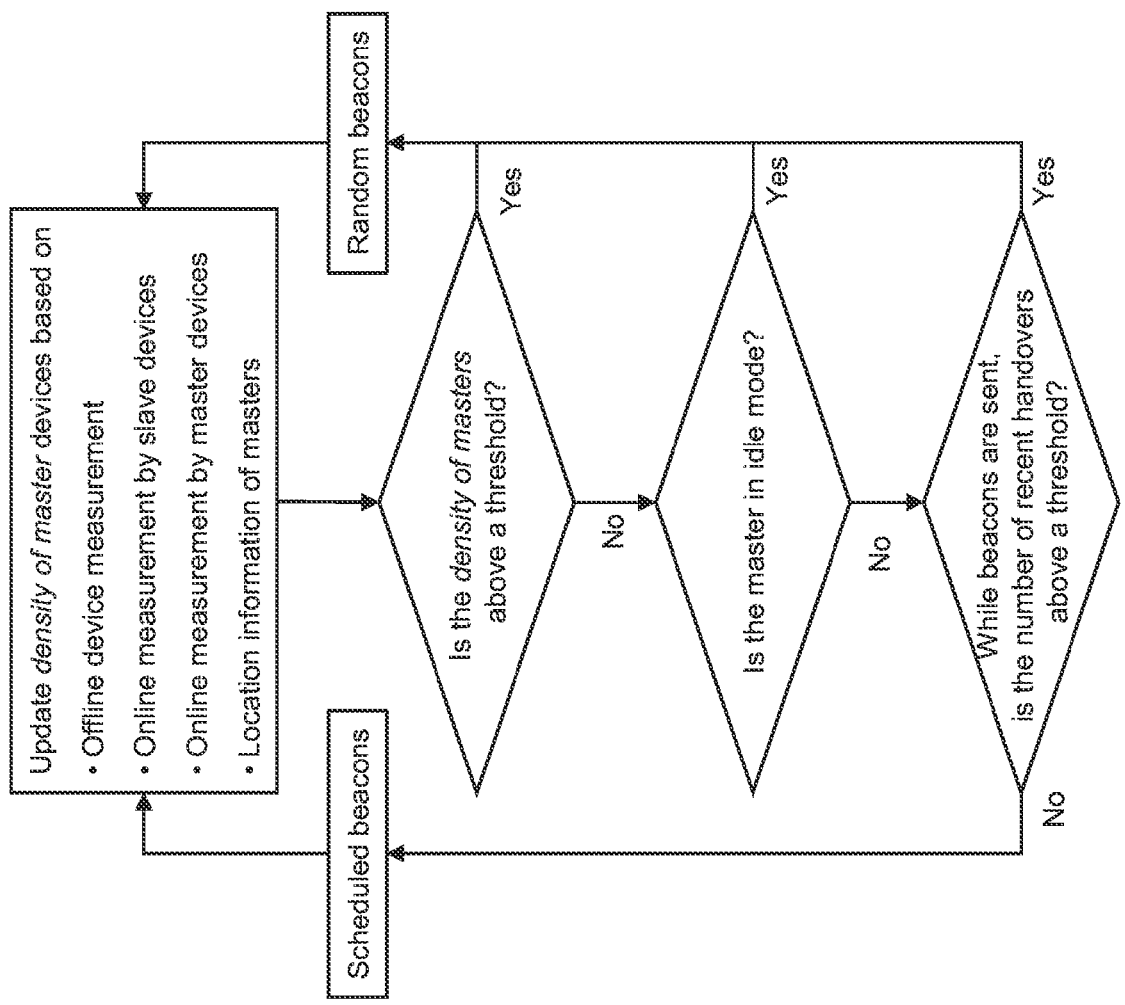
FIG. 5 is a flowchart depicting embodiments of a method in a cellular communications network.

Even when the first master device 121 is in connected mode, frequent mobility to other cells may require new resource assignments in the new cell for scheduled beacon signals while such beacon signals are being sent. Hence, it may be advantageous to measure the number of handovers in the resent past e.g. over a given time window, while a beacon signal is being sent, and limit the scheduled beacon signal method to the master devices 121, 122 where this number of handover is below a threshold. This helps avoiding too frequent beacon signal resource re-assignments and the associated signaling. This process is shown in FIG. 5. Again, it is possible to use hysteresis on the threshold number of recent handovers.

Parameters of Random Beacon Signals

The density of master devices 121, 122 is estimated in the above process with the purpose of selecting between random or scheduled beacon signal transmission scheme. When the random beacon signal scheme is selected, the density of master devices 121, 122, i.e. the number of master devices 121, 122 transmitting beacon signals within the D2D range of a given slave 123 (denoted here by M), is useful for other purposes as well. The density of master devices 121, 122, may further be the number of master devices 121, 122 transmitting beacon signals within the specific area.

In the random beacon signal scheme, each master device 121, 122 may determine in a randomized fashion whether it transmits a beacon signal in a given resource or not. However, if there are multiple master devices that transmit a beacon signal in the same resource, the beacon signal transmissions may collide and the receiver might not be able to decode the beacon. If the probability of the beacon signal transmission of individual master devices 121, 122 is too high, the probability of collisions are increased and the efficiency is reduced. On the other hand, if the probability of the beacon signal transmission of individual master devices 121, 122 is too low, the shared resources for sending beacon signals may not be sufficiently utilized, which also hurts efficiency.

It can therefore be expected that there is an optimal probability for the first master device 121 for sending beacon signals. This question is analyzed with a simplified mathematical model arriving at the following conclusions.

In a random scheme where each master device 121, 122 transmits in a given resource with a probability a independently in each resource, the optimal value of a is a=1/M, where M is the number of master devices within D2D range of a slave at a given location.

In another random scheme where the shared resources are divided into blocks of K resources and each master device 121, 122 picks one resource randomly out of the K resources, it is determined that the optimal value of K is approximated by K≠1.4 M.

There are many other random schemes by which the master devices 121, 122 may randomize their beacon signal transmissions, but in all cases it is expected that there is an intermediate parameter setting which determines the probability of beacon signal transmission such that efficiency is maximized because the shared resources is sufficiently utilized, yet the number of collisions is limited.

Based on the information on the density of the master devices 121, 122 that are transmitting beacon signals, the network node 130 may adaptively determine the optimal or near-optimal parameter settings that the master devices 121, 122 can use to make the beacon signal transmissions efficient. Therefore the network node 130 may help the master devices 121, 122 by advising on the parameter settings for random beacon signal transmissions. This may be done by broadcasting parameters for the random beacon signal scheme, or signaling to individual master devices 121, 122 to update their parameter settings.

On Demand Vs. Autonomous Beacon Signals

When the first master device 121 is discovered relatively infrequently, on demand beacon signal transmission may help reducing the power consumption of the first master device 121 as well as avoid wasting the resources for broadcasting beacon signals. Autonomous beacon signal transmission becomes more efficient when the first master device 121 is being discovered so frequently that it takes more resource to signal on demand beacon signal transmission than to do it autonomously.

The network node 130 therefore needs to consider the relative overhead of the signaling for on demand beacon signal transmission using either dedicated signaling to the first master device 121 or using a broadcast channel, and the associated first master device 121 battery consumption as well as air interface resource usage and signaling overhead. This shall be compared with the overhead of autonomous beacon signal transmissions where the first master device 121 may send more beacon signals than needed in case there is no slave listening for the beacon signals. The network node 130 makes a comparison of the expected overhead of the two schemes, and chooses the one which is expected to lower the overhead based on the actual network traffic (e.g. based on the registered slave devices) and deployment.

To determine whether to use the on demand or the autonomous approach for the first master device 121, the network node 130 may calculate the overhead of the on demand scheme. There are multiple measures to consider for the overhead: the comparison may be based on the first master device 121 energy consumption, or the radio resource usage, or a combination of these.

Figure 6:
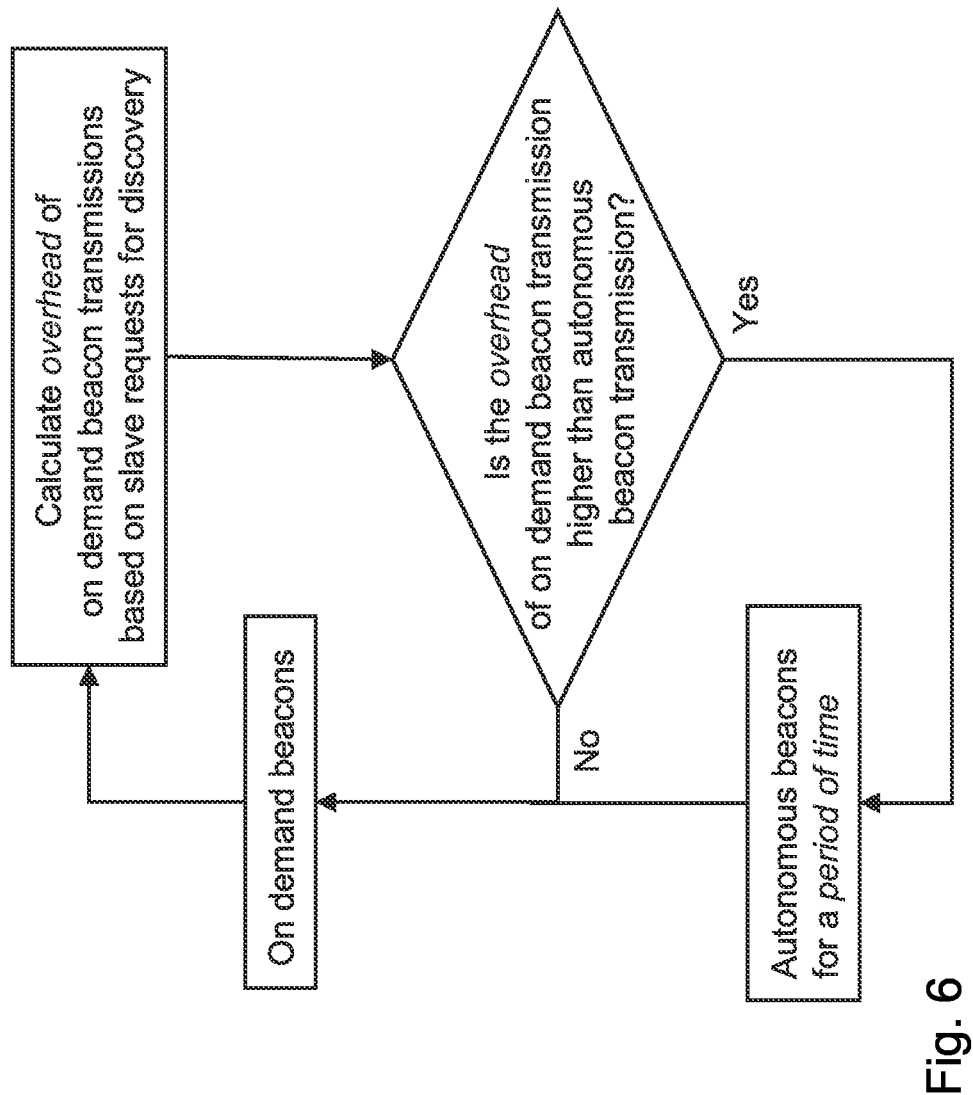
FIG. 6 is a flowchart depicting embodiments of a method in a cellular communications network.

The FIG. 6 shows one possible realization of an adaptive scheme to select between on demand or autonomous approaches. The network node 130 starts using the on demand scheme, and calculates the overhead of the on demand scheme based on the actual signaling for device discovery for a given master device such as the first master device 121. When it is considered that the autonomous beacon signal transmission would reduce the overhead, the network node 130 switches to autonomous mode, and notifies the first master device to autonomously send beacon signals for a given period of time. Once this period of time expires, the first master device 121 returns to on demand mode again, and the network node 130 may once again determine whether the autonomous mode is beneficial or not from an overhead point of view.

Note that an adaptive scheme may be applied for the period of time while the first master device 121 is in autonomous mode, so that subsequent periods of autonomous mode may be made longer and longer; on the other hand, if the autonomous mode stops being more efficient, then the network node 130 may start again with a shorter period for the next autonomous mode when it takes place later on.

Figure 7:
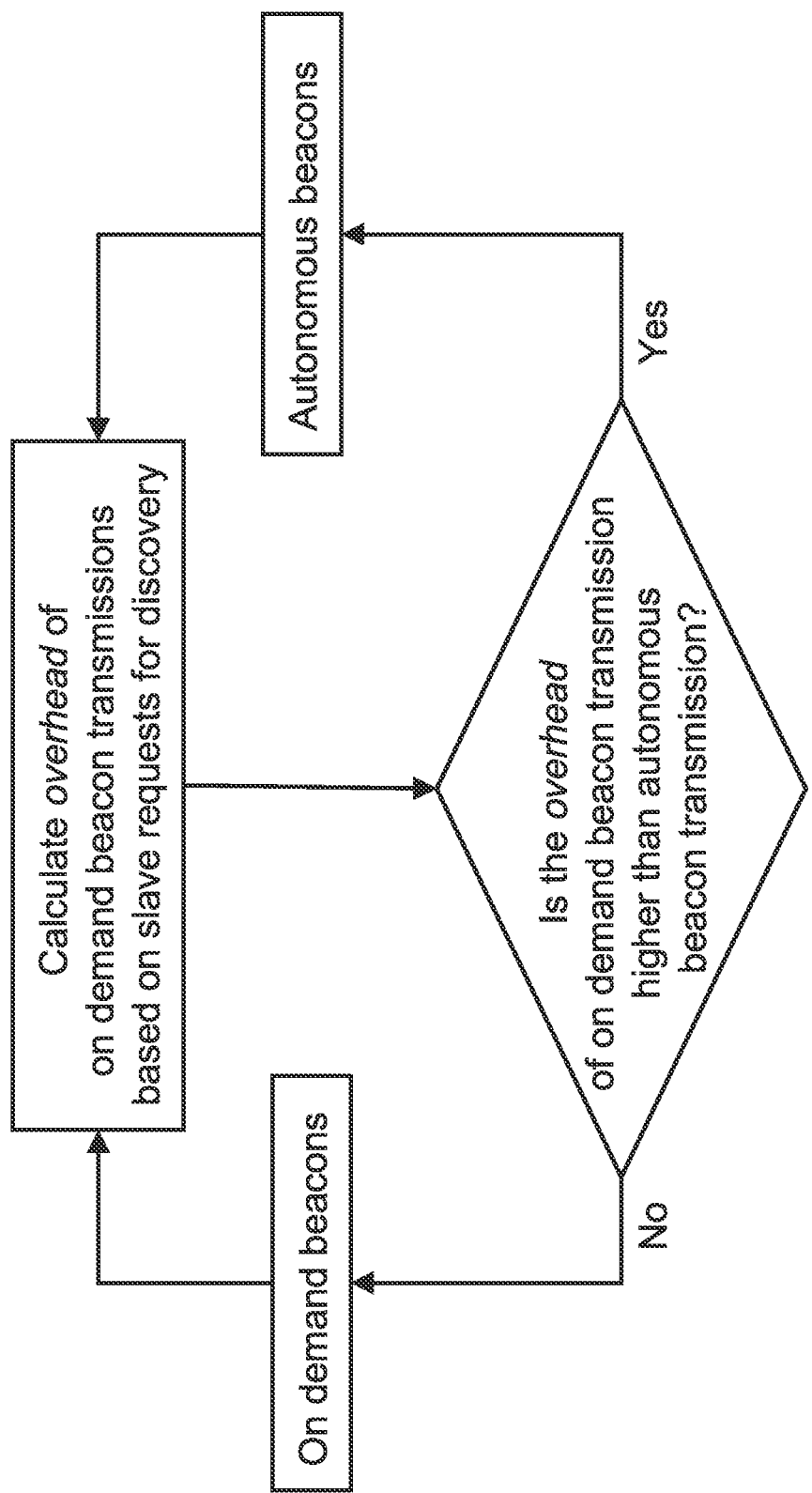
FIG. 7 is a flowchart depicting embodiments of a method in a cellular communications network.

In case the slave device 123 and other slave devices always query the network node 130 for discovery, the network node 130 may have accurate information on the slave device 123 and other slave devices device discovery statistics. Therefore the network node 130 may calculate the overhead of on demand beacon signal transmission scheme even while the first master device 121 uses the autonomous beacon signal transmission method. So in this case there is no need to limit the autonomous beacon signal transmission method for a period of time only, as shown in the flowchart of FIG. 7.

The calculation of the overhead above and the decision for on demand vs. autonomous beacon signals may be performed for each master device 121, 122 individually. Alternatively, it is possible to combine the calculation and mode selection for a group of master devices 121, 122 at nearby locations. It is also possible to combine the calculation for master devices 121, 122 in the same service category.

Besides this, the network node 130 may use other information, such as per service or application configuration, to determine whether to use the on demand or autonomous approach.

On demand beacon signal transmission may also be used in such a way that the first master device 121 is requested to send more beacon signals than actually needed for a given slave device such as the slave device 123. I.e., the slave device 123 as a single slave device can trigger the first master device 121 to send beacon signals autonomously for a period of time without further explicit triggers, in an expectation that more slave devices may be looking for the first master device 121. In some scenarios, depending on the usage pattern, this may be an approach that is in-between the completely on demand beacon signal transmission and the completely autonomous beacon signal transmission schemes.

Besides the overhead, the network node 130 may also take into account other factors such as delay of discovery. For certain applications, the delay of discovery may be important, and it is possible that on demand beacon signal transmission may provide a shorter delay, since autonomous beacon signal transmission uses periodic broadcast of beacon signals, and the period may be too long for certain applications.

Differentiation by Service Categories.

As describe above, the master devices 121, 122 may be categorized into service categories based on the services that they provide, such as for example printing services, social networking services, file transfer services, or advertising services, so that the resources for beacon signal transmission are separated for each service category. The concept of service categories helps the slave device 123, since it would only need to receive the beacon signals that correspond to the service categories that the slave device 123 is interested in. Hence the use of service categories may help the slave device 123 to lower its energy consumption.

On the other hand, creating more service categories also increases the overhead since each set of resources for a separate service category has to be signaled separately. Additionally, there may be master devices 121, 122 who could provide services in multiple service categories, and they would then need to send multiple beacon signals for each service category. There may also be slave devices 123 that are interested in multiple service categories, and they may have to open their receivers for a longer time.

As the optimal number of service categories depends on the above factors, that network node 130 may take into account the number of master devices 121, 122 in a given area, and other factors such as the number of slave devices 123, and the distribution of services offered by the master devices 121, 122, to decide how many service categories are differentiated for sending beacon signals. It is expected that an adaptive decision based on the actual network conditions leads to a more efficient resource utilization than an a priori setting.

Each master device 121, 122 may signal to the network node 130 the service(s) that it offers using a hierarchy of encoded service names. The network node 130 may then decide how many service categories to differentiate, and use the hierarchy of the service names to put a given master device such as the master device 121 into one of the service categories.

Technology for Sending Beacon Signals.

In case of a system where multiple D2D technologies are present, the network node 130 may also adapt the radio technology used for sending beacon signals.

One aspect of adapting the D2D technology is to pick a technology that is available in both the first master device and the slave devices such as the slave device 123. Additionally, the network node 130 may also take into account other factors, such as the energy consumption of the master devices 121, 122 and slave devices 123, the expected time for discovery using the various technologies, and the radio resource availability for the different D2D technologies.

In this way, the network node 130 may efficiently integrate a number of D2D technologies into a common system in an optimized way.

Scalability

As the network node 130 has to handle a large number of devices, it is important to facilitate scalability of its implementation. Scalability may be enabled by design, e.g. where the network node 130 comprises of a number of servers, and the number of servers may be increased as the number of terminals, i.e. the master devices and slave devices grows. It is possible to realize multiple servers such that each server is responsible for a geographical area. As an extreme, it is possible to implement DDCS servers in base stations. It is also possible to realize multiple servers in other ways such that even within the same area, the terminals, i.e. the master devices and slave devices are distributed between servers, e.g. randomly.

The network node or the DDCS maintains a database of terminals that are registered to it. This database may be managed centrally so that multiple servers may access the same database. Alternatively, each server may have its own database so that servers may communicate with each other if they need to access each other's database.

There are numerous techniques existing in the state of the art for handling such large servers and databases, hence the internal arrangement of the network node and the DDCS is not discussed further here.

The signaling schemes below illustrate some of the options discussed in this document. Note that the signalling should be regarded as examples, and there may be variations of the signaling, by changing the ordering, or using additional signaling such as acknowledgements, or the charts can be modified in other ways.

Figure 8:
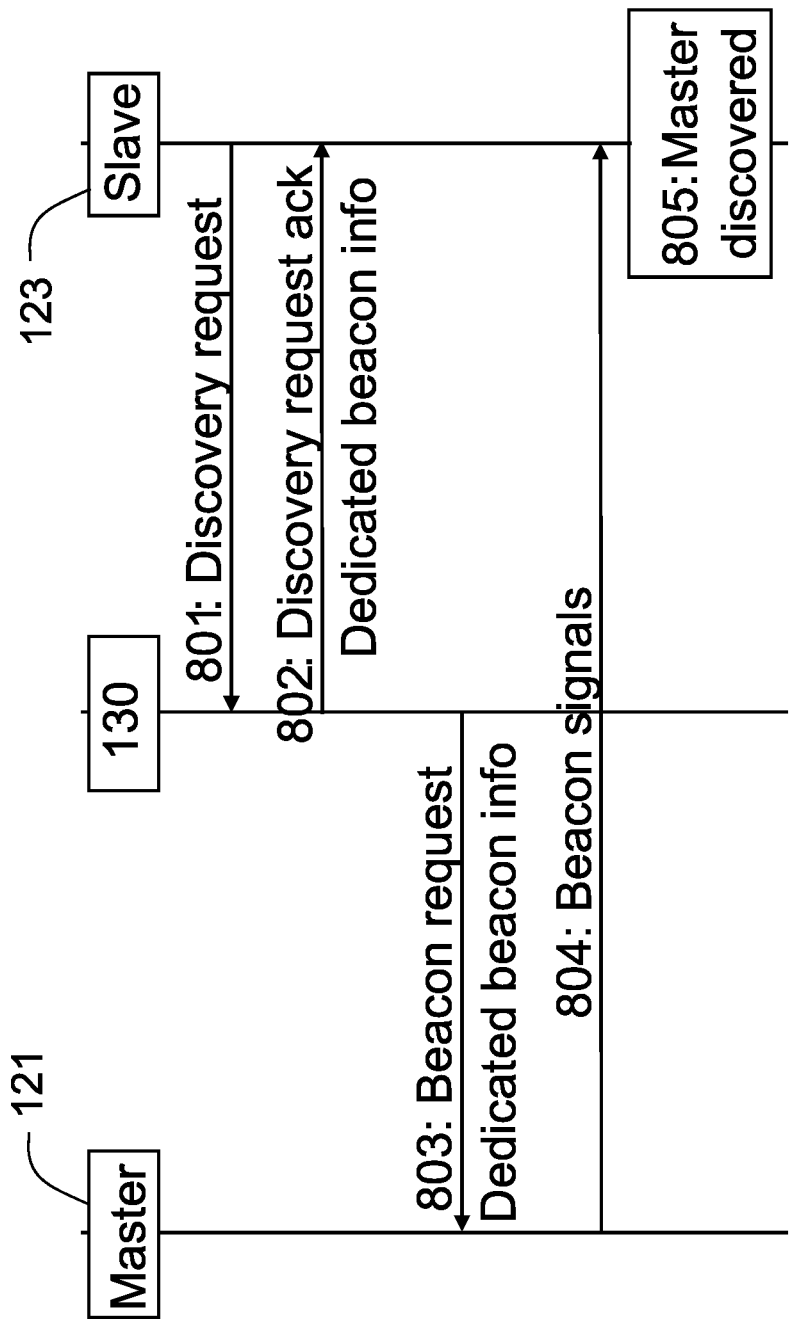
FIG. 8 is a signaling diagram depicting embodiments of a method in a cellular communications network.

In FIG. 8 on demand scheduled beacon signals is depicted. The signalling comprises the following actions:

801. The slave device 123 signals to the network node 130 its request to discover master devices 121, 122 with certain characteristics.

802. The network node 130 assigns dedicated resources for beacon signal transmission, and informs the slave device 123 about the dedicated beacon signal information.

803. The network node 130 assigns the dedicated beacon resources to the first master device 121.

804. The beacon signal is sent by the first master device 121 on the assigned resource.

805. The slave device 123 receives the beacon signal, and the first master device 121 is then discovered.

Figure 9:
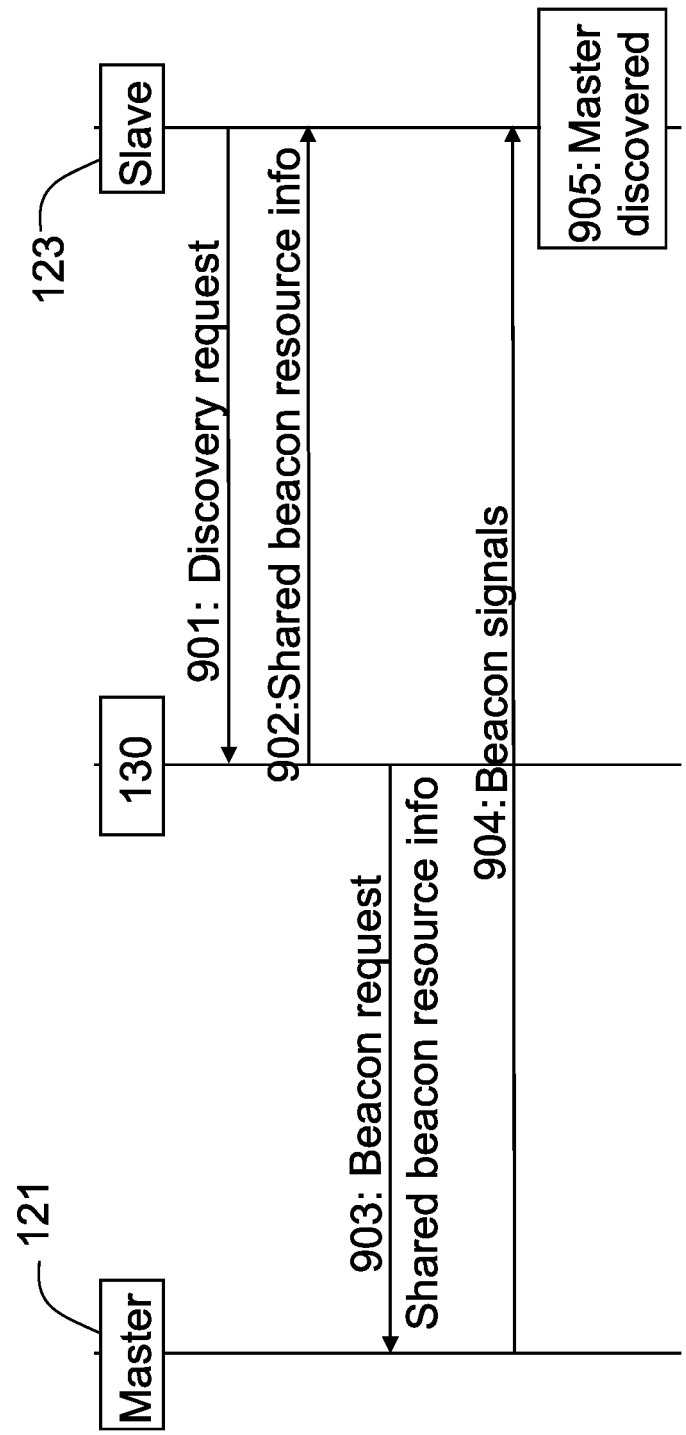
FIG. 9 is a signaling diagram depicting embodiments of a method in a cellular communications network.

In FIG. 9 on demand random beacon signals is depicted. The signalling comprises the following actions:

901. The slave device 123 signals to the network node 130 its request to discover master devices 121, 122 with certain characteristics.

902. The network node 130 informs the slave 123 about shared resources for beacon signal transmission. Note that this information may be provided to the slave device 123 earlier as well, e.g. via a broadcast channel.

903. The network node 130 signals to the first master device 123 to trigger beacon signal transmission. The network node 130 may also inform the first master device about the shared resources for beacon signal transmission. Or alternatively this information may already be sent to the master earlier, e.g. via the broadcast channel.

904. The beacon signals are sent on the assigned resource. There may be more than one beacon signal transmission needed.

905. The slave device 123 receives the beacon, and the first master device is then discovered.

Figure 10:
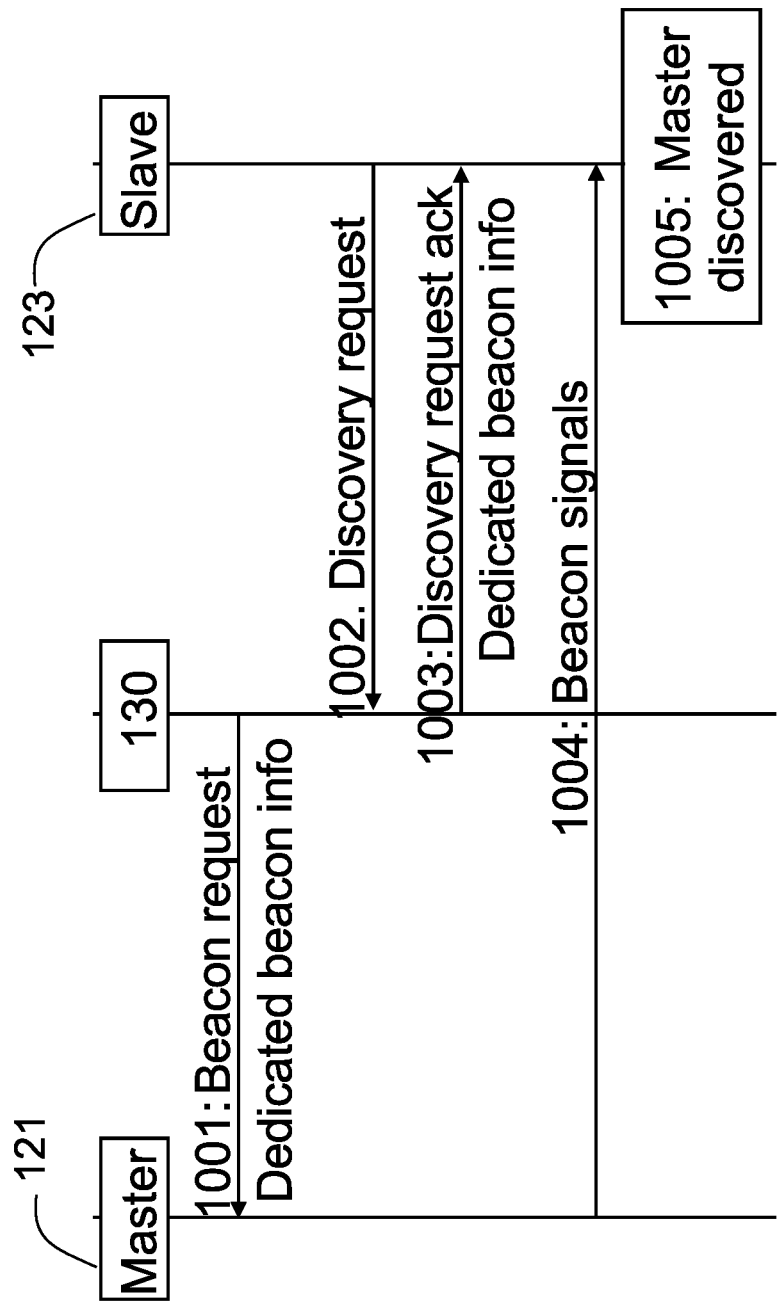
FIG. 10 is a signaling diagram depicting embodiments of a method in a cellular communications network.

FIG. 10 depicts autonomous scheduled beacon signals with slave device query. The signalling comprises the following actions:

1001. The network node 130 assigns dedicated resources to the first master device 121 even before a request for discovery arrives.

1002. The slave device 123 signals to the network node 130 its request to discover master devices with certain characteristics.

1003. The network node 130 informs the slave device 123 about the dedicated beacon signal info.

1004. The beacon signals are sent by the first master device 121 on the assigned resource.

1005. The slave device 123 receives the beacon signals, and the first master device is then discovered.

Figure 11:
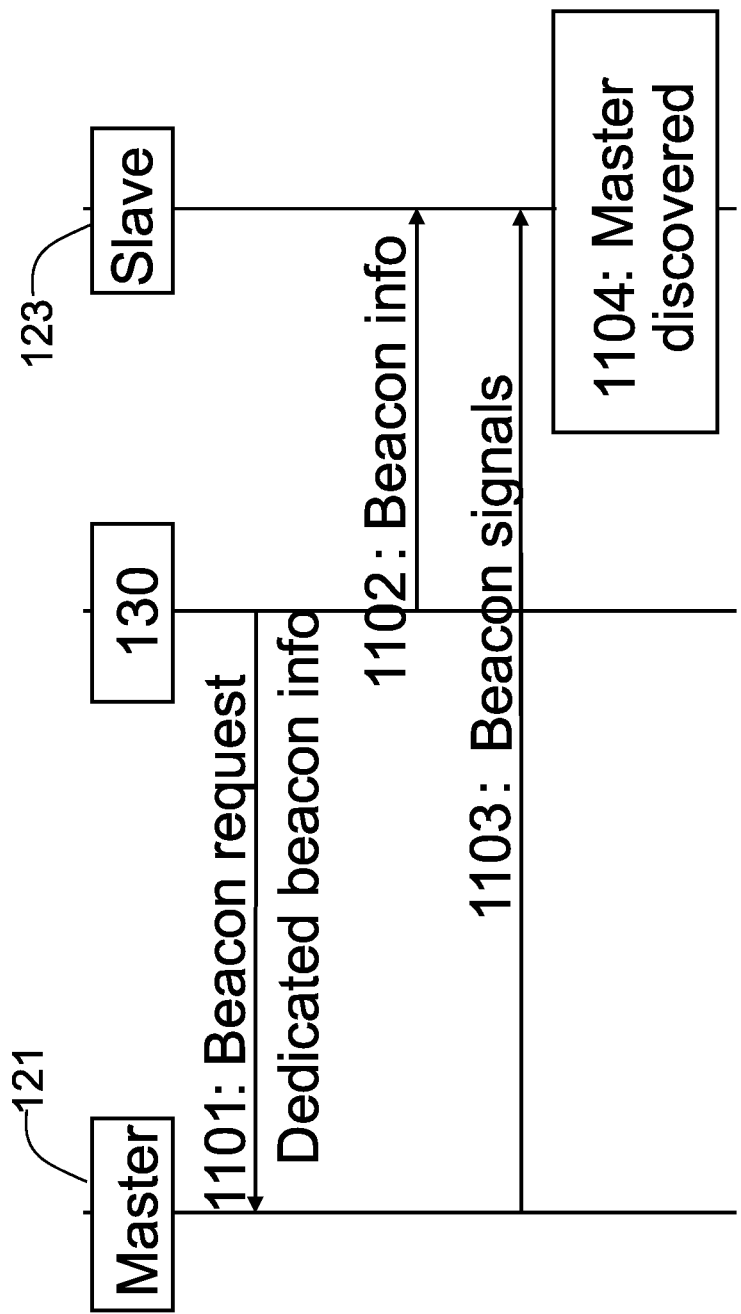
FIG. 11 is a signaling diagram depicting embodiments of a method in a cellular communications network.

FIG. 11 depicts autonomous scheduled beacon signals without slave device query. The signalling comprises the following actions:

1101. The network node 130 assigns dedicated resources to the first master device 121 even before a request for discovery arrives.

1102. The network node 130 informs the slave device 123 about the set of resources where beacon signals may be sent. This information may be broadcast.

1103. The beacon signals are sent on the assigned resource.

1104. The slave device 123 receives the beacon signals, and the first master device 121 is then discovered.

Figure 12:
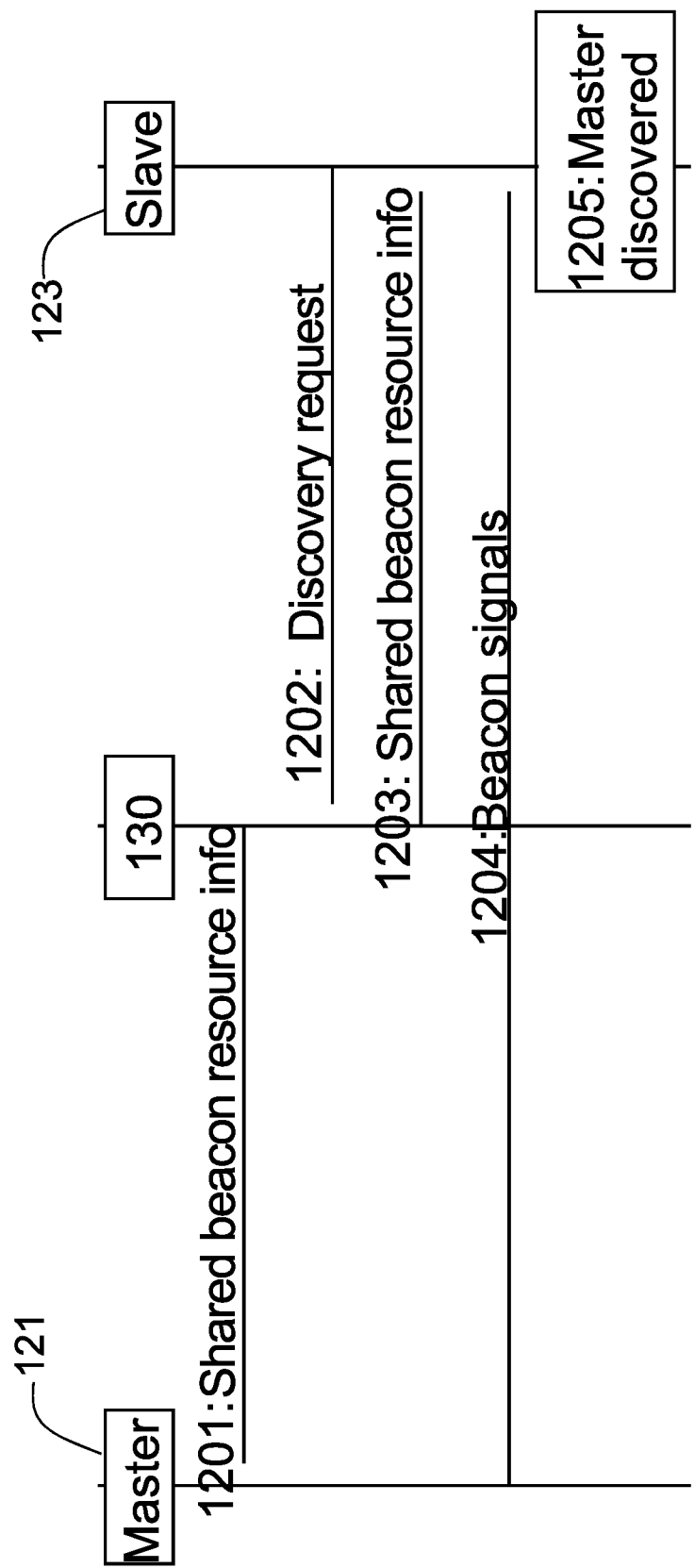
FIG. 12 is a signaling diagram depicting embodiments of a method in a cellular communications network.

FIG. 12 depicts autonomous random beacon signals with slave query. The signalling comprises the following actions:

1201. The network node 130 informs the first master device 121 about the shared resources for beacon signal transmission. This information may be sent via the broadcast channel.

1202. The slave device 123 signals to network node 130 its request to discover master devices with certain characteristics.

1203. The network node 130 informs the slave device 123 about shared resources for beacon signal transmission. Note that this information might be provided to the slave device 123 earlier as well, e.g. via the broadcast channel.

1204. The beacon is sent by the first master device 121 on the shared resource.

1205. The slave device 123 receives the beacon, and the first master device 121 is then discovered.

Figure 13:
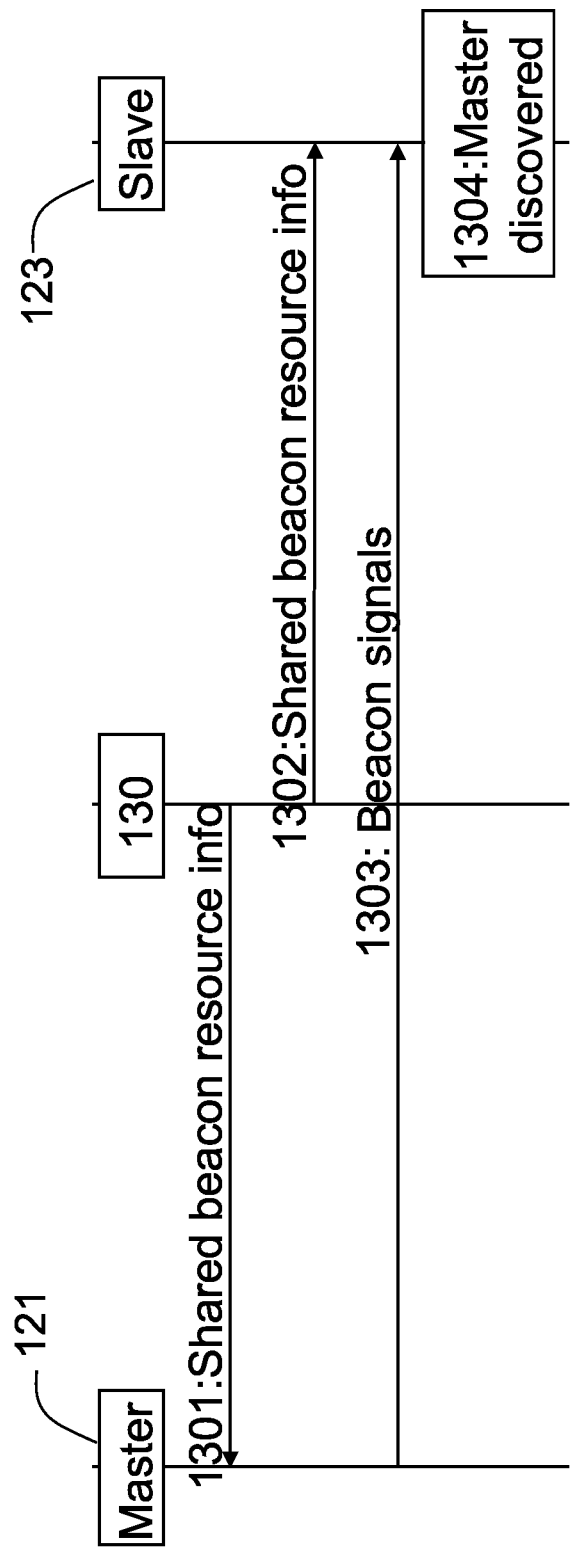
FIG. 13 is a signaling diagram depicting embodiments of a method in a cellular communications network.

FIG. 13 depicts autonomous random beacon signals without slave query. The signalling comprises the following actions:

1301. The network node 130 informs the first master device 121 about the shared resources for beacon signal transmission. This information may be sent via the broadcast channel.

1302. The network node 130 informs slave device 123 about shared resources for beacon signal transmission. This information might be provided to the slave device 123 earlier, e.g. via the broadcast channel.

1303. The beacon signals are sent by the first master device 121 on the shared resource.

1304. The slave device 123 receives the beacon signals, and the first master device 121 is then discovered.

An advantage with embodiments herein is that the network assisted device discovery framework enables the integration of multiple device-to-device wireless technologies in a single network, and facilitates master and slave devices to agree on the same wireless technology to be used for device-to-device communication. In case the slave device 123 query the network node 130 for device discovery, this brings additional benefits:

- The network node 130 may have more information about the master devices 121, 122 compared to what is available from the beacon signals based on the detailed information provided by the master devices 121, 122 when they register to the network node 130. Therefore the network node 130 may help the slave device 123 to find the appropriate first master device 121, i.e., the network node 130 may act as a directory service.
- The signaling of the slave device 123 to the network node 130 reduces the need for the master devices 121, 122 to autonomously send beacon signals, i.e. the master devices 121, 122 may be triggered by the network node 130, hence this may reduce the energy and resource usage of the master devices.
- The signaling of the slave device 123 to the network node 130 also lets the network node 130 become aware of the number and location of the slave devices, and this helps the network node 130 to better determine the optimal mode of operation including the beacon signal configuration parameters for the master devices.

Below embodiments of the method in the respective different node will be described in FIGS. 14, 16 and 18, and embodiments of the respective node will be described FIGS. 15, 17 and 19.

An example of embodiments of a method in a network node 130 for handling beacon signal transmission, will now be described with reference to a flowchart depicted in FIG. 14. As mentioned above, the beacon signal transmission is for discovering devices for D2D transmission. The network node 130 is associated with a cellular communications network 100. The method comprises the following actions, which actions may be taken in any suitable order.

Action 1401

The network node 130 obtains information from a number of master devices 121, 122 within a specific area comprised in the cellular communications network 100. The respective information comprises information about location and capability of D2D transmission of the respective master devices 121, 122.

This action may further comprise obtaining information from a number of slave devices 123 within the specific area. The respective information comprises information about location and capability of D2D, transmission of the respective slave devices 123, and/or the estimated number of master devices 121,122 within the D2D range of the respective slave devices 123.

The obtained information from the number of master devices 121, 122 may comprise information about the number of master devices within the respective master device's 121, 122 D2D range.

The obtained information from the respective master device 121, 122 may further comprise information about which service it offers.

Action 1402

In some embodiments, the network node 130 estimates the number of master devices 121, 122 within a D2D range of the slave device 121.

Action 1403

The network node 130 decides properties for beacon signal transmission from the first master device 121. The deciding is based on the obtained information, and the number of master devices 121, 122 within the specific area.

In some embodiments the deciding of properties comprises deciding whether to use random beacon signal transmission on a shared resource or scheduled beacon signal transmission, based on whether the first master device 121 is in idle mode or not, and/or based on the number of handovers of the first master device 121 within the specific area, wherein the first master device 121 is comprised in the number of master devices.

In some embodiments the deciding 1403 of the properties comprises deciding whether to use on demand beacon signal transmission, or autonomous beacon signal transmission based on a calculated overhead of on demand beacon signal transmissions within the specific area and a calculated overhead of autonomous beacon signal transmissions within the specific area.

Action 1404

The network node 130 sends an indication about the decided properties to the first master device 121. The indication is any one or more of: radio access technology, timing and frequency channel properties of the beacon signals.

Action 1404

The network node 130 sends, an indication about the decided properties to the slave device 121. This enables the slave device 123 to discover the first master device 121 by listening to beacon signals transmitted by the first master device 121.

The indication to the slave device 123 may comprise any one or more of: whether to register a device discovery request of the slave device 123 at the network node 130 or not, and timing and frequency channel properties that should be used by the slave device 123 to receive beacon signals transmitted by the first master device 121.

Figure 15:
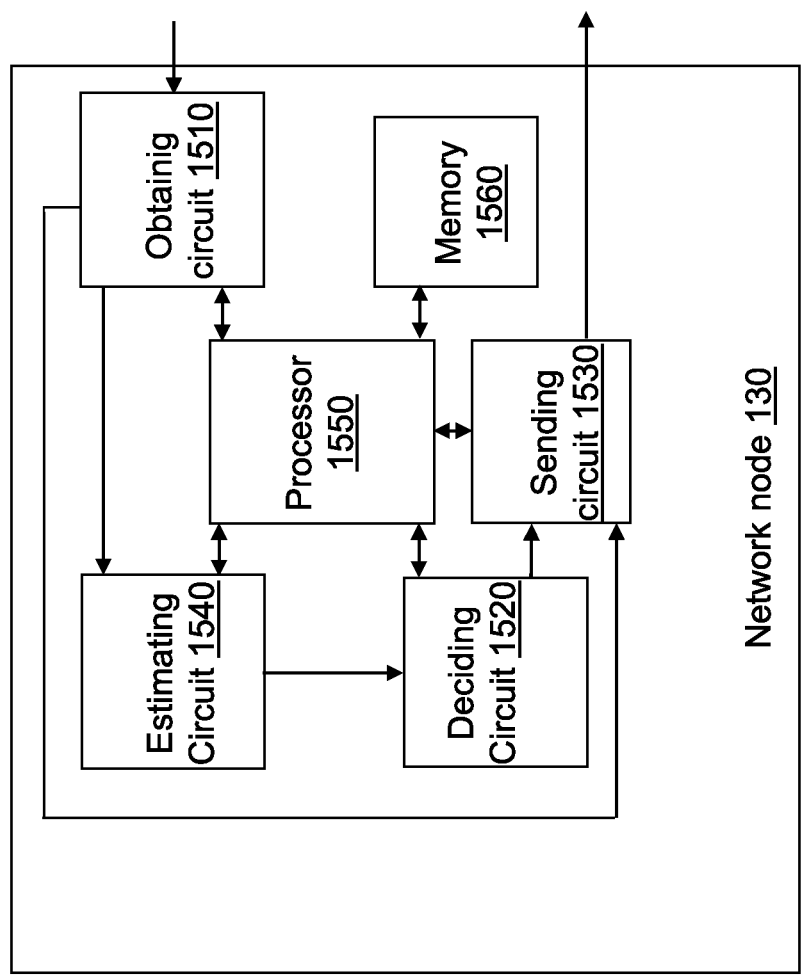
FIG. 15 is a schematic block diagram illustrating embodiments of a network node.
Figure 16:
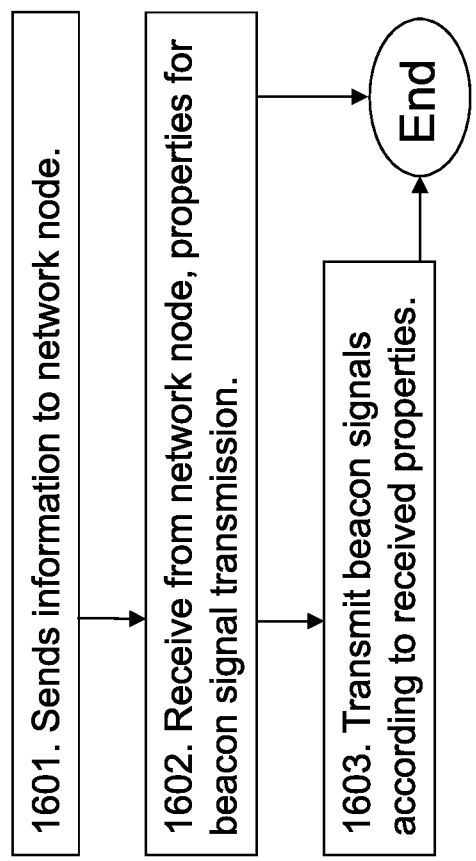
FIG. 16 is a flowchart depicting embodiments of a method in a master device.

To perform the method actions for handling beacon signal transmission described above in relation to FIG. 14, the network node 130 comprises the following arrangement depicted in FIG. 15. As mentioned above the beacon signal transmission is for discovering devices for D2D transmission, and the network node 130 is associated with the cellular communications network 100.

The network node 130 comprises an obtaining circuitry 1510 configured to obtain information from a number of master devices 121, 122 within a specific area comprised in the cellular communications network 100. The respective information comprises information about location and capability of D2D transmission of the respective master devices 121, 122.

The obtained information from the number of master devices 121, 122 may comprise information about the number of master devices 121, 122 within the respective master device's 121, 122 D2D range. The information to be obtained from the respective master device 121, 122 may further comprise information about which service it offers.

The obtaining circuitry 1510 may further be configured to obtain information from a number of slave devices 123 within the specific area. The respective information comprises information about location and capability of D2D, transmission of the respective slave devices 123, and the estimated number of master devices 121, 122 within the D2D range of the respective slave devices 123.

The network node 130 further comprises a deciding circuitry 1520 configured to decide properties for beacon signal transmission from a first master device 121. The deciding is based on the obtained information, and the number of master devices 121, 122 within the specific area.

In some embodiments the deciding circuitry 1520 further is configured to decide properties comprising whether to use random beacon signal transmission on a shared resource or scheduled beacon signal transmission, based on whether the first master device 121 is in idle mode or not, and/or based on the number of handovers of the first master device 121 within the specific area, wherein the first master device 121 is comprised in the number of master devices.

In some embodiments the deciding circuitry 1520 further is configured to decide properties comprising whether to use on demand beacon signal transmission, or autonomous beacon signal transmission, based on a calculated overhead of on demand beacon signal transmissions within the specific area and a calculated overhead of autonomous beacon signal transmissions within the specific area.

The network node 130 may further comprises a sending circuitry 1530 configured to send an indication about the decided properties to the first master device 121, which indication is any one or more of: radio access technology, timing and frequency channel properties of the beacon signals.

In some embodiments, the sending circuitry 1530 further is configured to send an indication about the decided properties to a slave device 121. This enables the slave device 123 to discover the first master device 121 by listening to beacon signals transmitted by the first master device 121. The indication to the slave device may comprises any one or more of: whether to register a device discovery request of the slave device 123 at the network node 130 or not, and timing and frequency channel properties that should be used by the slave device 123 to receive beacon signals transmitted by the first master device 121.

The network node 130 may further comprise an estimating circuitry 1540 configured to estimate the number of master devices 121, 122 within a D2D range of the slave device 121.

The embodiments herein for handling beacon signal transmission may be implemented through one or more processors, such as a processor 1550 in the network node 130 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the in the network node 130. One such carrier may be in the form of a CD ROM disc. It is however feasible with other data carriers such as a memory stick. The computer program code may furthermore be provided as pure program code on a server and downloaded to the network node 130.

The network node 130 may further comprise a memory 1560 comprising one or more memory units. The memory 1560 is arranged to be used to store information obtained from the master devices 121, 122 and the slave device 123, decisions about the beacon signal transmission properties, store data, configurations, schedulings, and applications to perform the methods herein when being executed in the network node 130.

Those skilled in the art will also appreciate that the obtaining circuitry 1510, deciding circuitry 1520, sending circuitry 1530 and estimating circuitry 1540 described above may refer to a combination of analog and digital circuits, and/or one or more processors configured with software and/or firmware, e.g. stored in a memory, that when executed by the one or more processors such as the processor 1550 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

An example of embodiments of a method in the first master device 121 for handling beacon signal transmission, will now be described with reference to a flowchart depicted in FIG. 16. As mentioned above, the beacon signal transmission is for discovering devices for D2D transmission, which first master device 121 is comprised in a number of master devices in a specific area within a cellular communications network 100. The method comprises the following actions, which actions may be taken in any suitable order.

Action 1601

The first master device 121 sends information to the network node 130 associated with the cellular communications network 100. The information comprises information about location and capability of D2D transmission of the first master device 121.

The information sent to the network node 130 may further comprise any one or more of:

Information that the first master device 121 is a master device, information about the number of slave devices 123 being in the D2D range of the first master device 121, information about the number of master devices 121, 122 being in the D2D range of the first master device 121, and information about which service the first master device 121 offers.

Action 1602

The first master device 121 receives an indication of properties for beacon signal transmission from the network node 130. The beacon signal is to be transmitted from the first master device 121. The which properties are adapted to the number of master devices 121, 122 within the specific area and their respective location and capability of D2D transmission.

In some embodiments the indication of properties comprises any one or more of: radio access technology, timing and frequency channel properties of the beacon signals.

The received indication of properties may further comprise whether to use random beacon signal transmission on a shared resource, or scheduled beacon signal transmission. This indication of use is adapted to whether the first master device 121 is in idle mode or not, and/or adapted to the number of handovers of the first master device 121 within the specific area, wherein the first master device 121 is comprised in the number of master devices.

The received indication of properties may further comprise an indication whether to use on demand beacon signal transmission, or autonomous beacon signal transmission.

This indication of use is adapted to an overhead of on demand beacon signal transmissions within the specific area and an overhead of autonomous beacon signal transmissions within the specific area.

Action 1603

The first master device 121 then transmits beacon signals according to the received indication of properties of beacon signal transmission to be listened to by a slave device 121. This enables the slave device 123 to discover the first master device 121.

Figure 17:
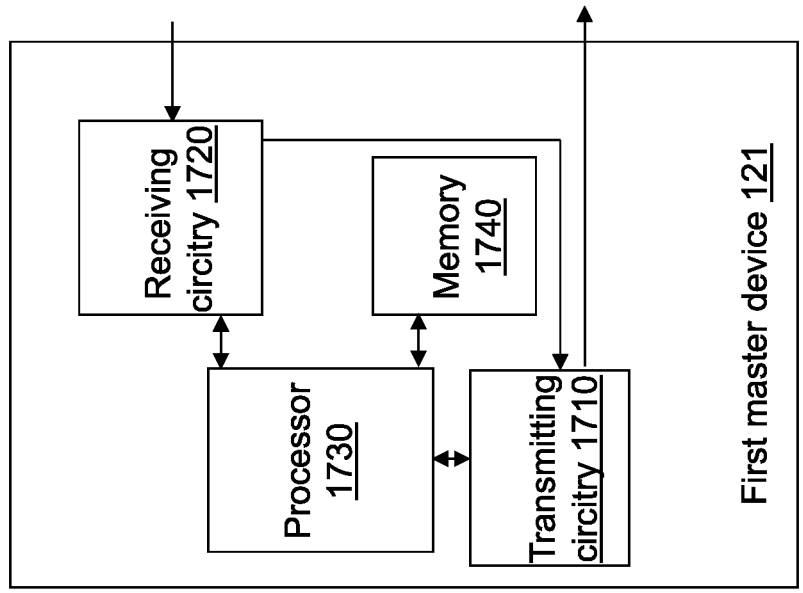
FIG. 17 is a schematic block diagram illustrating embodiments of a master device.

To perform the method actions for handling beacon signal transmission described above in relation to FIG. 16, the first master device 121 comprises the following arrangement depicted in FIG. 17. As mentioned above the beacon signal transmission is for discovering devices for D2D transmission. Further, the first master device 121 is arranged to be comprised in a number of master devices in a specific area within a cellular communications network 100.

The first master device 121 comprises a transmitting circuitry 1710 configured to send information to a network node 130 associated with the cellular communications network 100. The information comprises information about location and capability of Device to Device, D2D, transmission of the first master device 121.

The information to be sent to the network node 130 further comprises any one or more of:

Information that the first master device 121 is a master device, information about the number of slave devices 123 being in the D2D range of the first master device 121, information about the number of master devices 121, 122 being in the D2D range of the first master device 121, and information about which service the first master device 121 offers.

The transmitting circuitry 1710 may further be configured to transmit beacon signals according to the received indication of properties of beacon signal transmission to be listened to by a slave device 121, enabling the slave device 123 to discover the first master device 121.

The first master device 121 further comprises a receiving circuitry 1720 configured to receive an indication of properties for beacon signal transmission from the network node 130, which beacon signal is to be transmitted from the first master device 121, and which properties are adapted to the number of master devices 121, 122 within the specific area and their respective location and capability of D2D transmission.

The indication may be any one or more of: radio access technology, timing and frequency channel properties of the beacon signals.

The indication to be received may further comprise whether to use random beacon signal transmission on a shared resource, or scheduled beacon signal transmission. Indicated use is adapted to whether the first master device 121 is in idle mode or not and/or the number of handovers of the first master device 121 within the specific area wherein the first master device 121 is comprised in the number of master devices.

The indication of properties to be received may further comprise an indication whether to use on demand beacon signal transmission, or autonomous beacon signal transmission. This indication of use is adapted to an overhead of on demand beacon signal transmissions within the specific area and an overhead of autonomous beacon signal transmissions within the specific area.

The embodiments herein for handling beacon signal transmission may be implemented through one or more processors, such as a processor 1730 in the first master device 121 depicted in FIG. 17, together with computer program code for performing the functions and actions of the embodiments herein. The program code mentioned above may also be provided as a computer program product, for instance in the form of a data carrier carrying computer program code for performing the embodiments herein when being loaded into the in the first master device 121. One such carrier may be in the form of a CD ROM disc. It is however feasible with other data carriers such as a memory stick. The computer program code may furthermore be provided as pure program code on a server and downloaded to the first master device 121.

The first master device 121 may further comprise a memory 1740 comprising one or more memory units. The memory 1740 is arranged to be used to store information to be sent to the network node 130, decisions about the beacon signal transmission properties, data, configurations, schedulings, and applications to perform the methods herein when being executed in the first master device 121.

Those skilled in the art will also appreciate that the transmitting circuitry 1710, and the receiving circuitry 1720 described above may refer to a combination of analog and digital circuits, and/or one or more processors configured with software and/or firmware, e.g. stored in a memory, that when executed by the one or more processors such as the processor 1730 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

An example of embodiments of a method in the slave device 123 for handling beacon signal transmission, will now be described with reference to a flowchart depicted in FIG. 18. As mentioned above, which beacon signal transmission is for discovering devices for D2D transmission. The slave device 123 is comprised in a specific area within a cellular communications network 100. The method comprises the following actions, which actions may be taken in any suitable order.

Action 1801

In some embodiments, the slave device 123 sends information to the network node 130 within the cellular communications network 100. The information comprises any one or more of:

location of the slave device 123, capability of D2D transmission of the slave device 123, and an estimated number of master devices 121, 122 within the D2D range of the slave device 123.

Action 1802

In some embodiments, the slave device 123 sends a request to the network node 130, to discover a specific master device with certain characteristics. This may e.g. be. a characteristic which provides a given service at a specific location or to re-discover an already known device.

Action 1803

The slave device 123 receives from the network node 130 associated with the cellular communications network 100, an indication of properties of beacon signal transmission, the beacon signal is to be transmitted from the first master device 121 within the specific area to the slave device 123. The properties are adapted to the number of master devices 121, 122 within the specific area and their respective location and capability of D2D transmission.

In some embodiments, the received indication comprises an indication whether to use random beacon signal transmission on a shared resource, or scheduled beacon signal transmission. The indicated use is adapted to whether the first master device 121 is in idle mode or not and/or is adapted to the number of handovers of the first master device 121 within the specific area wherein the first master device 121 is comprised in the number of master devices.

The received indication of properties may comprise an indication whether to use on demand beacon signal transmission, or autonomous beacon signal transmission. The indication of use is adapted to an overhead of on demand beacon signal transmissions within the specific area and an overhead of autonomous beacon signal transmissions within the specific area.

The information sent to the network node 130 may further comprise any one or more of: location information of the slave device 123, information that the slave device 123 is a slave device.

The received indication of properties comprises may further comprise any one or more of: Whether to register a device discovery request of the slave device 123 at the network node 130 or not, and timing and frequency channel properties of the beacon signals transmitted by the first master device 121.

This action may further comprise receiving from the network node 130, an indication of properties of beacon signal transmission to be transmitted by the specific master device in cases where requested, wherein the specific master device is the first master device 121.

Action 1804

The slave device 123 discovers the first master device 121 by listening to the beacon signal transmission according to the received indication of properties of beacon signal transmission.

Figure 19:
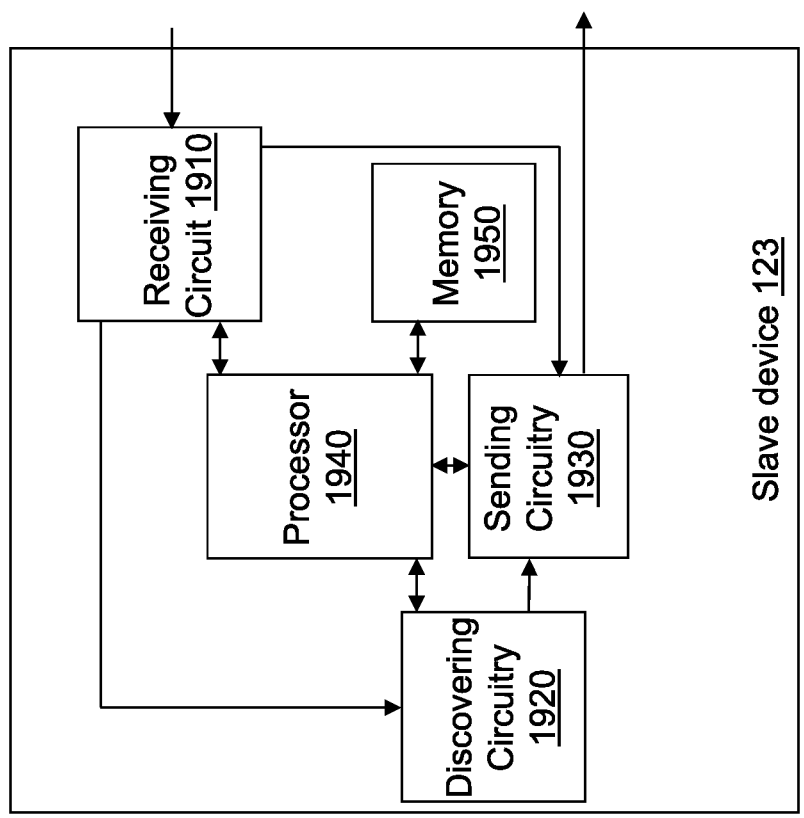
FIG. 19 is a schematic block diagram illustrating embodiments of a slave device.

To perform the method actions for handling beacon signal transmission described above in relation to FIG. 18, the slave device 123 comprises the following arrangement depicted in FIG. 19. As mentioned above the beacon signal transmission is for discovering devices for D2D transmission. The which slave device 123 is arranged to be comprised in a specific area within a cellular communications network 100.

The slave device 123 comprises a receiving circuitry 1910 configured to receive from a network node 130 associated with the cellular communications network 100, an indication of properties of beacon signal transmission, which beacon signal is to be transmitted from a first master device 121 within the specific area to the slave device 123, which properties are adapted to the number of master devices 121, 122 within the specific area and their respective location and capability of D2D transmission.

The indication of properties to be received may comprise an indication whether to use random beacon signal transmission on a shared resource, or scheduled beacon signal transmission. The indicated use adapted to whether the first master device 121 is in idle mode or not, and/or the number of handovers of the first master device 121 within the specific area wherein the first master device 121 is comprised in the number of master devices.

The indication of properties to be received may further comprise an indication whether to use on demand beacon signal transmission, or autonomous beacon signal transmission. The indicated use is adapted to an overhead of on demand beacon signal transmissions within the specific area and an overhead of autonomous beacon signal transmissions within the specific area.

The indication of properties to be received may further comprise any one or more of:

whether to register a device discovery request of the slave device 123 at the network node 130 or not, timing and frequency channel properties of the beacon signals transmitted by the first master device 121.

The slave device 123 further comprises a discovering circuitry 1920 configured to discover the first master device 121 by listening to the beacon signal transmission according to the received indication of properties of beacon signal transmission.

In some embodiments, the slave device 123 further comprises a sending circuitry 1930 configured to send a request to the network node 130, to discover a specific master device with certain characteristics. In these embodiments the receiving circuitry 1910 is further configured to receive an indication from the network node 130. The indication is an indication of properties of beacon signal transmission to be transmitted by the specific master device, wherein the specific master device is the first master device 121.

The sending circuitry 1930 may further be configured to send information to the network node 130 within the cellular communications network 100. The information may comprise any one or more of location of the slave device 123, capability of D2D transmission of the slave device 123, and an estimated number of master devices 121, 122 within the D2D range of the slave device 123.

In some embodiments, sending circuitry 1930 further is configured to send information to the network node comprising any one or more of: location information of the slave device 123, information that the slave device 123 is a slave device.

The embodiments herein for handling beacon signal transmission may be implemented through one or more processors, such as a processor 1940 in the slave device 123 depicted in FIG. 19, together with computer program code for performing the functions and actions of the embodiments herein. The program code mentioned above may also be provided as a computer program product, for instance in the form of a data carrier carrying computer program code for performing the embodiments herein when being loaded into the in the slave device 123. One such carrier may be in the form of a CD ROM disc. It is however feasible with other data carriers such as a memory stick. The computer program code may furthermore be provided as pure program code on a server and downloaded to the slave device 123.

The slave device 123 may further comprise a memory 1950 comprising one or more memory units. The memory 1950 is arranged to be used to store information to be sent to the network node 130, decisions about the beacon signal transmission properties, data, configurations, schedulings, and applications to perform the methods herein when being executed in the slave device 123.

Those skilled in the art will also appreciate that the a receiving circuitry 1910, the discovering circuitry 1920, and sending circuitry 1930, described above may refer to a combination of analog and digital circuits, and/or one or more processors configured with software and/or firmware, e.g. stored in a memory, that when executed by the one or more processors such as the processor 1940 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for handling beacon signal transmission, which beacon signal transmission is for discovering devices for Device to Device (D2D) transmission and which network node is associated with a cellular communications network, the method comprising:
   obtaining information from a number of master devices within a specific area comprised in the cellular communications network, which respective information comprises information about location and capability of D2D transmission of the respective master devices;
   deciding properties for beacon signal transmission from a first master device, which deciding is based on the obtained information and the number of master devices within the specific area.

2. The method of claim 1, wherein said deciding properties comprises deciding whether to use random beacon signal transmission on a shared resource or scheduled beacon signal transmission, based on whether the first master device is in idle mode or not, or based on the number of handovers of the first master device within the specific area, wherein the first master device is comprised in the number of master devices, or both.

3. The method of claim 1, wherein said deciding properties comprises deciding whether to use on demand beacon signal transmission, or autonomous beacon signal transmission based on a calculated overhead of on demand beacon signal transmissions within the specific area and a calculated overhead of autonomous beacon signal transmissions within the specific area.

4. The method of claim 1, further comprising sending to the first master device an indication about the decided properties, which indication is any one or more of: radio access technology, timing and frequency channel properties of the beacon signals.

5. The method of claim 1, further comprising sending to a slave device, an indication about the decided properties, enabling the slave device to discover the first master device by listening to beacon signals transmitted by the first master device.

6. The method of claim 5, wherein the indication to the slave device comprises any one or more of:
   whether to register a device discovery request of the slave device at the network node or not; and
   timing and frequency channel properties that should be used by the slave device to receive beacon signals transmitted by the first master device.

7. The method of claim 1, wherein the obtaining information further comprises obtaining information from a number of slave devices within the specific area, which respective information comprises information about location and capability of D2D, transmission of the respective slave devices, and the estimated number of master devices within the D2D range of the respective slave devices.

8. The method of claim 1, further comprising estimating the number of master devices within a D2D range of the slave device.

9. The method of claim 1, wherein the obtained information from the number of master devices comprises information about the number of master devices within the respective master device's D2D range.

10. The method of claim 1, wherein the obtained information from the respective master device comprises information about which service it offers.

11. A method in a first master device for handling beacon signal transmission, which beacon signal transmission is for discovering devices for Device to Device (D2D) transmission, which first master device is comprised in a number of master devices in a specific area within a cellular communications network, the method comprising:
  sending information to a network node associated with the cellular communications network, which information comprises information about location and capability of D2D transmission of the first master device; and
  receiving from the network node an indication of properties for beacon signal transmission, which beacon signal is to be transmitted from the first master device, and which properties are adapted to the number of master devices within the specific area and their respective location and capability of D2D transmission.

12. The method of claim 11, further comprising:
  transmitting beacon signals of the received indication of properties of beacon signal transmission to be listened to by a slave device, enabling the slave device to discover the first master device.

13. The method of claim 11, wherein the received indication of properties is any one or more of: radio access technology, timing and frequency channel properties of the beacon signals.

14. The method of claim 13, wherein the received indication of properties comprises whether to use random beacon signal transmission on a shared resource, or scheduled beacon signal transmission, which use is adapted to whether the first master device is in idle mode or not, and/or adapted to the number of handovers of the first master device within the specific area, wherein the first master device is comprised in the number of master devices.

15. The method of claim 11, wherein the received indication of properties comprises an indication whether to use on demand beacon signal transmission, or autonomous beacon signal transmission, which use is adapted to an overhead of on demand beacon signal transmissions within the specific area and an overhead of autonomous beacon signal transmissions within the specific area.

16. The method of claim 11, wherein the information sent to the network node further comprises any one or more of:
  information that the first master device is a master device;
  information about the number of slave devices being in the D2D range of the first master device;
  information about the number of master devices being in the D2D range of the first master device; and
  information about which service the first master device offers.

17. A method in a slave device for handling beacon signal transmission, which beacon signal transmission is for discovering devices for Device to Device (D2D) transmission, and which slave device is comprised in a specific area within a cellular communications network, the method comprising:
  receiving from a network node associated with the cellular communications network, an indication of properties of beacon signal transmission, which beacon signal is to be transmitted from a first master device within the specific area to the slave device, which properties are adapted to the number of master devices within the specific area and their respective location and capability of D2D transmission.

18. The method of claim 17, further comprising:
  discovering the first master device by listening to the beacon signal transmission of the received indication of properties of beacon signal transmission.

19. The method of claim 17, wherein the received indication comprises an indication whether to use random beacon signal transmission on a shared resource, or scheduled beacon signal transmission, which use is adapted to whether the first master device is in idle mode or not and/or is adapted to the number of handovers of the first master device within the specific area wherein the first master device is comprised in the number of master devices.

20. The method of claim 17, wherein the received indication of properties comprises an indication whether to use on demand beacon signal transmission, or autonomous beacon signal transmission, which use is adapted to an overhead of on demand beacon signal transmissions within the specific area and an overhead of autonomous beacon signal transmissions within the specific area.

21. The method of claim 17, wherein the information sent to the network node further comprises any one or more of: location information of the slave device; and information that the slave device is a slave device.

22. The method of claim 17, wherein the received indication of properties comprises any one or more of:
  whether to register a device discovery request of the slave device at the network node or not; and
  timing and frequency channel properties of the beacon signals transmitted by the first master device.

23. The method of claim 17, further comprising sending a request to the network node, to discover a specific master device with certain characteristics, and wherein the receiving further comprises receiving from the network node, an indication of properties of beacon signal transmission to be transmitted by the specific master device, wherein the specific master device is the first master device.

24. The method of claim 17, further comprising sending information to the network node within the cellular communications network, which information comprises any one or more of:
  location of the slave device;
  capability of D2D transmission of the slave device; and
  an estimated number of master devices within the D2D range of the slave device.

25. A network node for handling beacon signal transmission, which beacon signal transmission is for discovering devices for Device to Device (D2D) transmission, and which network node is associated with a cellular communications network, the network node comprising:
  an obtaining circuitry configured to obtain information from a number of master devices within a specific area comprised in the cellular communications network, which respective information comprises information about location and capability of D2D transmission of the respective master devices,
  a deciding circuitry configured to decide properties for beacon signal transmission from a first master device, which deciding is based on the obtained information, and the number of master devices within the specific area.

26. The network node of claim 25, wherein the deciding circuitry is further configured to decide properties comprising whether to use random beacon signal transmission on a shared resource or scheduled beacon signal transmission, based on whether the first master device is in idle mode or not, and/or based on the number of handovers of the first master device within the specific area, wherein the first master device is comprised in the number of master devices.

27. The network node of claim 25, wherein the deciding circuitry is further configured to decide properties comprising whether to use on demand beacon signal transmission, or autonomous beacon signal transmission, based on a calculated overhead of on demand beacon signal transmissions within the specific area and a calculated overhead of autonomous beacon signal transmissions within the specific area.

28. The network node of claim 25, further comprising a sending circuitry configured to send an indication about the decided properties to the first master device, which indication is any one or more of: radio access technology, timing and frequency channel properties of the beacon signals.

29. The network node of claim 25, wherein the sending circuitry is further configured to send an indication about the decided properties to a slave device, enabling the slave device to discover the first master device by listening to beacon signals transmitted by the first master device.

30. The network node of claim 29, wherein the indication to the slave device comprises any one or more of:
  whether to register a device discovery request of the slave device at the network node or not; and
  timing and frequency channel properties that should be used by the slave device to receive beacon signals transmitted by the first master device.

31. The network node of claim 25, wherein the obtaining circuitry is further configured to obtain information from a number of slave devices within the specific area, which respective information comprises information about location and capability of D2D, transmission of the respective slave devices, and the estimated number of master devices within the D2D range of the respective slave devices.

32. The network node of claim 25, further comprising an estimating circuitry configured to estimate the number of master devices within a D2D range of the slave device.

33. The network node of claim 25, wherein the obtained information from the number of master devices comprises information about the number of master devices within the respective master device's D2D range.

34. The network node of claim 25, wherein the information to be obtained from the respective master device comprises information about which service it offers.

35. A first master device for handling beacon signal transmission, which beacon signal transmission is for discovering devices for Device to Device (D2D) transmission, which first master device is arranged to be comprised in a number of master devices in a specific area within a cellular communications network, the first master device comprising:
  a transmitting circuitry configured to send information to a network node associated with the cellular communications network, which information comprises information about location and capability of D2D transmission of the first master device; and
  a receiving circuitry configured to receive an indication of properties for beacon signal transmission from the network node, which beacon signal is to be transmitted from the first master device, and which properties are adapted to the number of master devices within the specific area and their respective location and capability of D2D transmission.

36. The first master device of claim 35, wherein the transmitting circuitry is further configured to transmit beacon signals of the received indication of properties of beacon signal transmission to be listened to by a slave device, enabling the slave device to discover the first master device.

37. The first master device of claim 35, wherein the indication is any one or more of: radio access technology, timing and frequency channel properties of the beacon signals.

38. The first master device of claim 37, wherein the indication of properties to be received comprises whether to use random beacon signal transmission on a shared resource, or scheduled beacon signal transmission, which use is adapted to whether the first master device is in idle mode or not and/or the number of handovers of the first master device within the specific area wherein the first master device is comprised in the number of master devices.

39. The first master device of claim 35, wherein the indication of properties to be received comprises an indication whether to use on demand beacon signal transmission, or autonomous beacon signal transmission, which use is adapted to an overhead of on demand beacon signal transmissions within the specific area and an overhead of autonomous beacon signal transmissions within the specific area.

40. The first master device of claim 35, wherein the information to be sent to the network node further comprises any one or more of:
  information that the first master device is a master device;
  information about the number of slave devices being in the D2D range of the first master device;
  information about the number of master devices being in the D2D range of the first master device; and
  information about which service the first master device offers.

41. A slave device for handling beacon signal transmission, which beacon signal transmission is for discovering devices for Device to Device (D2D) transmission, and which slave device is arranged to be comprised in a specific area within a cellular communications network, the slave device comprising:
  a receiving circuitry configured to receive from a network node associated with the cellular communications network, an indication of properties of beacon signal transmission, which beacon signal is to be transmitted from a first master device within the specific area to the slave device, which properties are adapted to the number of master devices within the specific area and their respective location and capability of D2D transmission.

42. The slave device of claim 41, further comprising:
  a discovering circuitry configured to discover the first master device by listening to the beacon signal transmission of the received indication of properties of beacon signal transmission.

43. The slave device of claim 41, wherein the indication of properties to be received comprises an indication whether to use random beacon signal transmission on a shared resource, or scheduled beacon signal transmission, which use is adapted to whether the first master device is in idle mode or not, and/or the number of handovers of the first master device within the specific area wherein the first master device is comprised in the number of master devices.

44. The slave device of claim 41, wherein the indication of properties to be received comprises an indication whether to use on demand beacon signal transmission, or autonomous beacon signal transmission, which use is adapted to an overhead of on demand beacon signal transmissions within the specific area and an overhead of autonomous beacon signal transmissions within the specific area.

45. The slave device of claim 41, wherein the indication of properties to be received comprises any one or more of:
  whether to register a device discovery request of the slave device at the network node or not,
  timing and frequency channel properties of the beacon signals transmitted by the first master device.

46. The slave device of claim 41, further comprising:
  a sending circuitry configured to send a request to the network node, to discover a specific master device with certain characteristics, and wherein the receiving circuitry is further configured to receive from the network node, an indication of properties of beacon signal transmission to be transmitted by the specific master device, wherein the specific master device is the first master device.

47. The slave device of claim 41, wherein the sending circuitry is further configured to send information to the network node comprising any one or more of: location information of the slave device, information that the slave device is a slave device.

48. The slave device of claim 41, wherein the sending circuitry is further configured to send information to the network node within the cellular communications network, which information comprises any one or more of:
    location of the slave device;
    capability of D2D transmission of the slave device; and
    an estimated number of master devices within the D2D range of the slave device.

* * * * *

UNITED STATES PATENT AND TRADEMARK OFFICE
CERTIFICATE OF CORRECTION

PATENT NO.        : 9,055,389 B2
APPLICATION NO.   : 13/498156
DATED             : June 9, 2015
INVENTOR(S)       : Miklos et al.

Page 1 of 2

It is certified that error appears in the above-identified patent and that said Letters Patent is hereby corrected as shown below:

On the Title Page, in Item (75), under "Inventors", in Column 1, Line 1, delete "Pilisborojenö" and insert -- Pilisborosjenö --, therefor.

On the Title Page, in Item (57), under "ABSTRACT", in Column 2, Line 2, delete "by a method in a method" and insert -- by a method --, therefor.

IN THE DRAWINGS

In Fig. 15, Sheet 15 of 18, in Box "1510", in Line 1, delete "Obtainig" and insert -- Obtaining --, therefor.

In Fig. 17, Sheet 16 of 18, in Box "1720", in Line 2, delete "circitry" and insert -- circuitry --, therefor.

In Fig. 17, Sheet 16 of 18, in Box "1710", in Line 2, delete "circitry" and insert -- circuitry --, therefor.

IN THE SPECIFICATION

In Column 2, Line 55, delete "by a method in a method" and insert -- by a method --, therefor.

In Column 6, Line 11, delete "an NodeB," and insert -- a NodeB, --, therefor.

In Column 6, Line 12, delete "an Home Node B, an Home" and insert -- a Home Node B, a Home --, therefor.

In Column 9, Line 23, delete "slave device 121." and insert -- slave device 123. --, therefor.

In Column 9, Line 25, delete "slave device 121" and insert -- slave device 123 --, therefor.
IN THE SPECIFICATION Signed and Sealed this
Twenty-third Day of February, 2016

Michelle K. Lee
*Director of the United States Patent and Trademark Office*

CERTIFICATE OF CORRECTION (continued)

U.S. Pat. No. 9,055,389 B2

In Column 10, Line 38, delete "slave device 121" and insert -- slave device 123 --, therefor.

In Column 13, Line 52, delete "first master device 130" and insert -- first master device 121 --, therefor.

In Column 17, Lines 54-55, delete "a independently" and insert -- an independently --, therefor.

In Column 17, Line 62, delete "$K \neq 1.4$ M." and insert -- $K \approx 1.4$ M. --, therefor.

In Column 21, Lines 12-13, delete "first master device 123" and insert -- first master device 121 --, therefor.

In Column 23, Line 14, delete "slave device 121." and insert -- slave device 123. --, therefor.

In Column 23, Line 40, delete "Action 1404" and insert -- Action 1405 --, therefor.

In Column 23, Line 42, delete "slave device 121." and insert -- slave device 123. --, therefor.

In Column 24, Line 39, delete "slave device 121." and insert -- slave device 123. --, therefor.

In Column 24, Line 50, delete "slave device 121." and insert -- slave device 123. --, therefor.

In Column 26, Line 8, delete "slave device 121." and insert -- slave device 123. --, therefor.

In Column 26, Line 38, delete "slave device 121," and insert -- slave device 123, --, therefor.

IN THE CLAIMS

In Column 31, Line 25, in Claim 13, delete "timing and" and insert -- and --, therefor.

In Column 33, Line 63, in Claim 37, delete "timing and" and insert -- and --, therefor.